US012711617B2

(12) United States Patent
Kunz et al.

(10) Patent No.: US 12,711,617 B2
(45) Date of Patent: Aug. 18, 2026

(54) SYSTEMS AND METHODS TO PROCESS ELECTRONIC IMAGES FOR HISTOLOGICAL MORPHOLOGY TRAJECTORY PREDICTION

(71) Applicant: PAIGE.AI, Inc., New York, NY (US)

(72) Inventors: Jeremy Daniel Kunz, New York, NY (US); Christopher Kanan, Pittsford, NY (US); George Shaikovski, London (GB)

(73) Assignee: Paige.AI, Inc., New York, NY (US)

( * ) Notice: Subject to any disclaimer, the term of this patent is extended or adjusted under 35 U.S.C. 154(b) by 536 days.

(21) Appl. No.: 18/324,665

(22) Filed: May 26, 2023

(65) Prior Publication Data

US 2023/0386031 A1 Nov. 30, 2023

Related U.S. Application Data

(60) Provisional application No. 63/365,418, filed on May 27, 2022.

(51) Int. Cl.
*G06T 7/00* (2017.01)
*G16H 30/40* (2018.01)
*G16H 50/20* (2018.01)

(52) U.S. Cl.
CPC .. *G06T 7/0012* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS 6,721,593 B2 * 4/2004 Anderson .............. A61B 5/282 600/509
2012/0010528 A1 * 1/2012 Donovan ................ G06T 7/194 382/128

(Continued)

FOREIGN PATENT DOCUMENTS

CN 114343604 * 4/2022 ............. A61B 5/055

OTHER PUBLICATIONS

Tang Z, Chuang KV, DeCarli C, Jin LW, Beckett L, Keiser MJ, Dugger BN. Interpretable classification of Alzheimer's disease pathologies with a convolutional neural network pipeline. Nat Commun. May 15, 2019;10(1):2173. doi: 10.1038/s41467-019-10212-1. PMID: 31092819; PMCID: PMC6520374. (Year: 2019).*

(Continued)

*Primary Examiner* — Beniyam Menberu
(74) *Attorney, Agent, or Firm* — Bookoff McAndrews, PLLC

(57) ABSTRACT

Systems and methods are described herein for processing electronic medical images to predict one or more histological morphologies. For example, one or more digital medical images may be received, the one or more digital medical images being of at least one pathology specimen associated with a patient. Patient clinical data for the patient may be received. A trained machine learning system may be determined. The patient clinic data and one or more digital medical images may be provided to the trained machine learning system. A histological morphology prediction of the patient may be determined, using the trained machine learning system. The histological morphology prediction may be output to a user and/or storage.

19 Claims, 17 Drawing Sheets

(56) References Cited

U.S. PATENT DOCUMENTS

| | | | | |
|---|---|---|---|---|
| 2020/0388386 | A1 | 12/2020 | Sharma et al. | |
| 2021/0019342 | A1 | 1/2021 | Peng et al. | |
| 2021/0228276 | A1* | 7/2021 | Giraldez | G09B 1/00 |
| 2021/0257094 | A1* | 8/2021 | Takemoto | G06T 7/0016 |
| 2021/0312652 | A1* | 10/2021 | Padwal | A61B 8/085 |
| 2022/0051047 | A1* | 2/2022 | Kanan | G16H 50/20 |
| 2022/0051403 | A1* | 2/2022 | Kanan | G16H 50/20 |
| 2022/0130556 | A1* | 4/2022 | Fujita | G16H 50/80 |
| 2023/0298176 | A1* | 9/2023 | Choi | A61B 5/02007<br>703/11 |

OTHER PUBLICATIONS

Tianyu et al, "Image prediction of disease progression by style-based manifold extrapolation", arXiv:2111.11439; Nov. 22, 2021; https://doi.org/10.48550/arXiv.2111.11439 (Year: 2021).*

Kim, C.-H.; Bhattacharjee, S.; Prakash, D.; Kang, S.; Cho, N.-H.; Kim, H.-C.; Choi, H.-K. Artificial Intelligence Techniques for Prostate Cancer Detection through Dual-Channel Tissue Feature Engineering. Cancers 2021, 13, 1524. https://doi.org/10.3390/cancers 13071524.

Plekhanov, A.A., Sirotkina, M.A., Sovetsky, A.A et al. Histological validation of in vivo assessment of cancer tissue inhomogeneity and automated morphological segmentation enabled by Optical Coherence Elastography. Sci Rep 10, 11781 (2020). https://doi.org/10.1038/s41598-020-68631-w.

The Current State of Preclinical Prostate Cancer Animal Models—Scientific Figure on ResearchGate. Available from: https://www.researchgate.net/figure/Histologic-and-molecular-changes-associated-with-prostate-tumorigenesisFor-more_fig4_5637376 [accessed May 26, 2023].

Barisoni, Laura, et al. "Digital pathology and computational image analysis in nephropathology." Nature Reviews Nephrology 16.11: 669-685, Aug. 26, 2020.

Karzai, Shkala, et al. "Ambient particulate matter air pollution is associated with increased risk of papillary thyroid cancer." Surgery 171.1: 212-219, Jun. 29, 2021.

* cited by examiner

SYSTEMS AND METHODS TO PROCESS ELECTRONIC IMAGES FOR HISTOLOGICAL MORPHOLOGY TRAJECTORY PREDICTION

CROSS-REFERENCE TO RELATED APPLICATION(S)

This application claims the benefit of priority to U.S. Provisional Patent Application No. 63/365,418, filed May 27, 2022, the entirety of which is incorporated by reference herein.

FIELD OF THE DISCLOSURE

Various embodiments of the present disclosure pertain generally to processing electronic images. More specifically, particular embodiments of the present disclosure relate to systems and methods for processing electronic images, among other metadata, using artificial intelligence (AI) technology, machine learning, and/or image processing techniques to predict histological morphology trajectories.

BACKGROUND

Patients may be monitored after a biopsy and/or a resection of tissue to monitor a state of a disease, such as cancer, affecting the patient's tissue. For example, follow up appointments for screening and/or additional biopsies may range from month intervals (e.g., three, six, nine months) to year intervals. Reducing the number of visits or having a large time interval between visits reduces costs, but also increases the chance that the cancer, if it has progressed and/or has recurred, will be detected in a later stage. In addition to clinical factors, a variety of non-clinical factors, such as air quality, water quality, sun exposure, population density, activity level, tobacco use, and/or diet, among other examples, may influence the trajectory of certain cancers over time, and thus may be important to account for when monitoring patients.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the present disclosure, systems and methods are disclosed for processing electronic medical images. In one aspect, a computer-implemented method for processing electronic medical images to predict one or more histological morphologies. The method may comprise receiving one or more digital medical images, the one or more digital medical images being of at least one pathology specimen associated with a patient; receiving patient clinical data for the patient; determining a trained machine learning system; providing the patient clinic data and one or more digital medical images to the trained machine learning system; determining, using the trained machine learning system, a histological morphology prediction of the patient; and outputting the histological morphology prediction to a user and/or storage.

The patient clinical data may includes at least one of heart rate, blood measurements, activity, and diet-related measurements. The method may further include receiving patient environmental data for the patient, the patient environmental data including temperature, ultraviolet (UV) index, air quality index (AQI), nitrogen dioxide levels, particulate matter levels, water quality levels, and/or population density.

The method may further include receiving location data of the patient. The method may also include identifying a saliency of each region within the one or more digital medical images; and excluding non-salient image regions from subsequent processing.

The method may further include determining a risk setting for the patient; inputting the risk setting in the trained machine learning system; and utilizing the risk setting to help determine the a histological morphology prediction of the patient.

The method may further include determining a confidence associated with the histological morphology prediction, the confidence being the confidence that the morphology prediction is present within a tissue of the patient at a given time point.

The method may further include determining a second histological morphology prediction for a future time point, the future time point being based on a type of cancer and associated characteristics thereof.

The method may further include determining an image representing a histological morphology prediction trajectories.

The method may further include determining by the trained machine learning system, a histological morphology trajectory; and determining one or more notifications to healthcare professionals and/or patients to indicate a follow-up appointment, screening, or procedure is to be scheduled based on the predicted histological morphology trajectories.

The histological morphology prediction may be of prostate tissue morphologies and the histological morphology predictions may includes prostatic intraepithelial neoplasia, necrosis, and/or atypical small acinar proliferation predictions.

The clinic data may be obtained from a wearable device on the patient.

According to certain aspects of the present disclosure, systems and methods are disclosed for processing electronic medical images. In another aspect, a system for processing electronic digital medical images may comprise at least one memory storing instructions and at least one processor configured to execute the instructions to perform operations. The at least one processor may comprise receiving one or more digital medical images, the one or more digital medical images being of at least one pathology specimen associated with a patient; receiving patient clinical data for the patient; determining a trained machine learning system; providing the patient clinic data and one or more digital medical images to the trained machine learning system; determining, using the trained machine learning system, a histological morphology prediction of the patient; and outputting the histological morphology prediction to a user and/or storage.

The patient clinical data may include at least one of: heart rate, blood measurements, activity, and/or diet-related measurements.

The system may further include receiving patient environmental data for the patient, the patient environmental data including temperature, ultraviolet (UV) index, air quality index (AQI), nitrogen dioxide levels, particulate matter levels, water quality levels, and/or population density.

The system may further include receiving location data of the patient.

The system may further include identifying a saliency of each region within the one or more digital medical images; and excluding non-salient image regions from subsequent processing.

The system may further include determining a risk setting for the patient; inputting the risk setting in the trained machine learning system; and utilizing the risk setting to help determine the a histological morphology prediction of the patient.

According to certain aspects of the present disclosure, systems and methods are disclosed for processing electronic medical images. In another aspect, a non-transitory computer-readable medium storing instructions that, when executed by a processor, perform operations processing electronic digital medical images, is disclosed. The operations may include receiving one or more digital medical images, the one or more digital medical images being of at least one pathology specimen associated with a patient; receiving patient clinical data for the patient; determining a trained machine learning system; providing the patient clinic data and one or more digital medical images to the trained machine learning system; determining, using the trained machine learning system, a histological morphology prediction of the patient; and outputting the histological morphology prediction to a user and/or storage.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
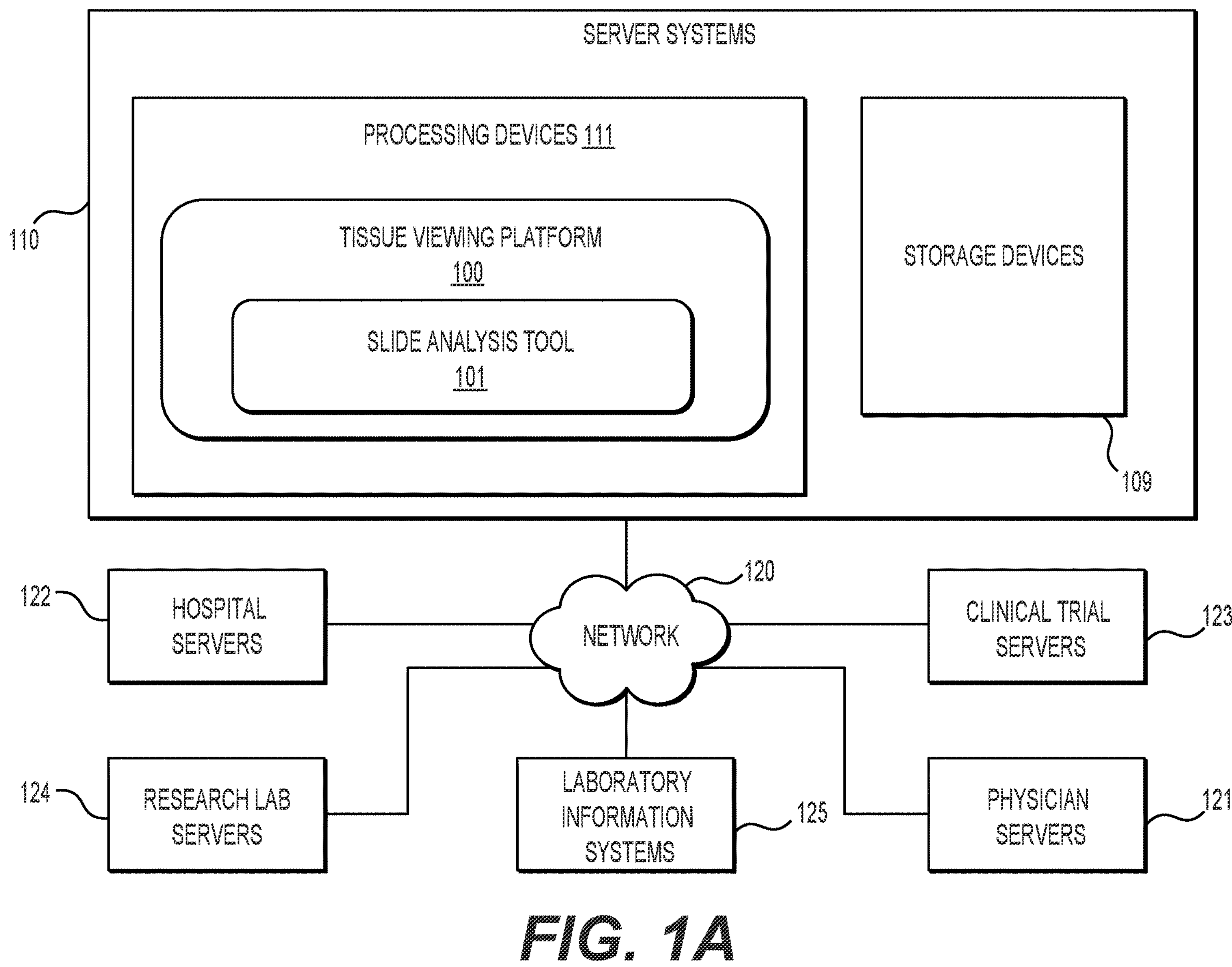
FIG. 1A illustrates an exemplary block diagram of a system and network for processing images to determine a histology morphology trajectory prediction, according to techniques presented herein.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Patients may be monitored after a biopsy and/or a resection of tissue to monitor a state of a disease, such as cancer, affecting the tissue. For example, in some scenarios, if cancer is detected from a tissue biopsy, but it is not severe enough or is otherwise not treated, the patient may instead be monitored (e.g., may be under active surveillance). In other examples, the patient may be treated, but due to possibility of recurrence of the cancer within months to many years following the treatment, the patient may continue to be monitored. As part of patient monitoring, follow up appointments for screening and/or additional biopsies may be scheduled and may range from month intervals (e.g., three, six, nine months) to year intervals dependent on a type of the cancer and a current state of the cancer and/or time elapsed since treatment. Reducing the number of visits or having a large time interval between visits reduces costs, but also increases the chance that the cancer, if it has progressed and/or has recurred, will be detected in a later stage. Also, in addition to clinical factors, a variety of non-clinical factors, such as air quality, water quality, sun exposure, population density, activity level, tobacco use, and/or diet, among other examples, may influence the trajectory of the cancer over time, and thus may be important to account for when monitoring patients. Therefore, a system for automatically predicting the state of the disease over time that accounts for the wide range of factors influencing the trajectory of the disease may be desirable to assist in more effective patient monitoring, including proactive scheduling of follow-up appointments, screenings, and/or procedures.

FIG. 1A illustrates a block diagram of a system and network for processing images to determine a histology morphology trajectory prediction, according to an exemplary embodiment of the present disclosure.

Specifically, FIG. 1A illustrates an electronic network 120 that may be connected to servers at hospitals, laboratories, and/or doctors' offices, etc. For example, physician servers 121, hospital servers 122, clinical trial servers 123, research lab servers 124, and/or laboratory information systems 125, etc., may each be connected to an electronic network 120, such as the Internet, through one or more computers, servers, and/or handheld mobile devices. According to an exemplary embodiment of the present disclosure, the electronic network 120 may also be connected to server systems 110, which may include processing devices 111 that are configured to implement a tissue viewing platform 100, which includes a slide analysis tool 101 for determining specimen property or image property information pertaining to digital pathology image(s), and using machine learning to classify a specimen, according to an exemplary embodiment of the present disclosure. The tissue viewing platform 100 may also include histology morphology trajectory prediction tool 141 for determining a histology morphology trajectory prediction. In other examples, the histology morphology trajectory prediction tool 141 may be operated separately from (e.g., by a different platform than) the tissue viewing platform 100.

The physician servers 121, hospital servers 122, clinical trial servers 123, research lab servers 124, and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124, and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124, and/or laboratory information systems 125 may transmit digitized slide images and/or patient-specific information to server systems 110 over the electronic network 120. Server systems 110 may include one or more storage devices 109 for storing images and data received from at least one of the physician servers 121, hospital servers 122, clinical trial servers 123, research lab servers 124, and/or laboratory information systems 125. Server systems 110 may also include processing devices for processing images and data stored in the one or more storage devices 109. Server systems 110 may further include one or more machine learning tool(s) or capabilities. For example, the processing devices may include a machine learning tool for a tissue viewing platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124, and/or laboratory information systems 125 refer to systems used by pathologists for reviewing the images of the slides. In hospital settings, tissue type information may be stored in one of the laboratory information systems 125.

Figure 1B:
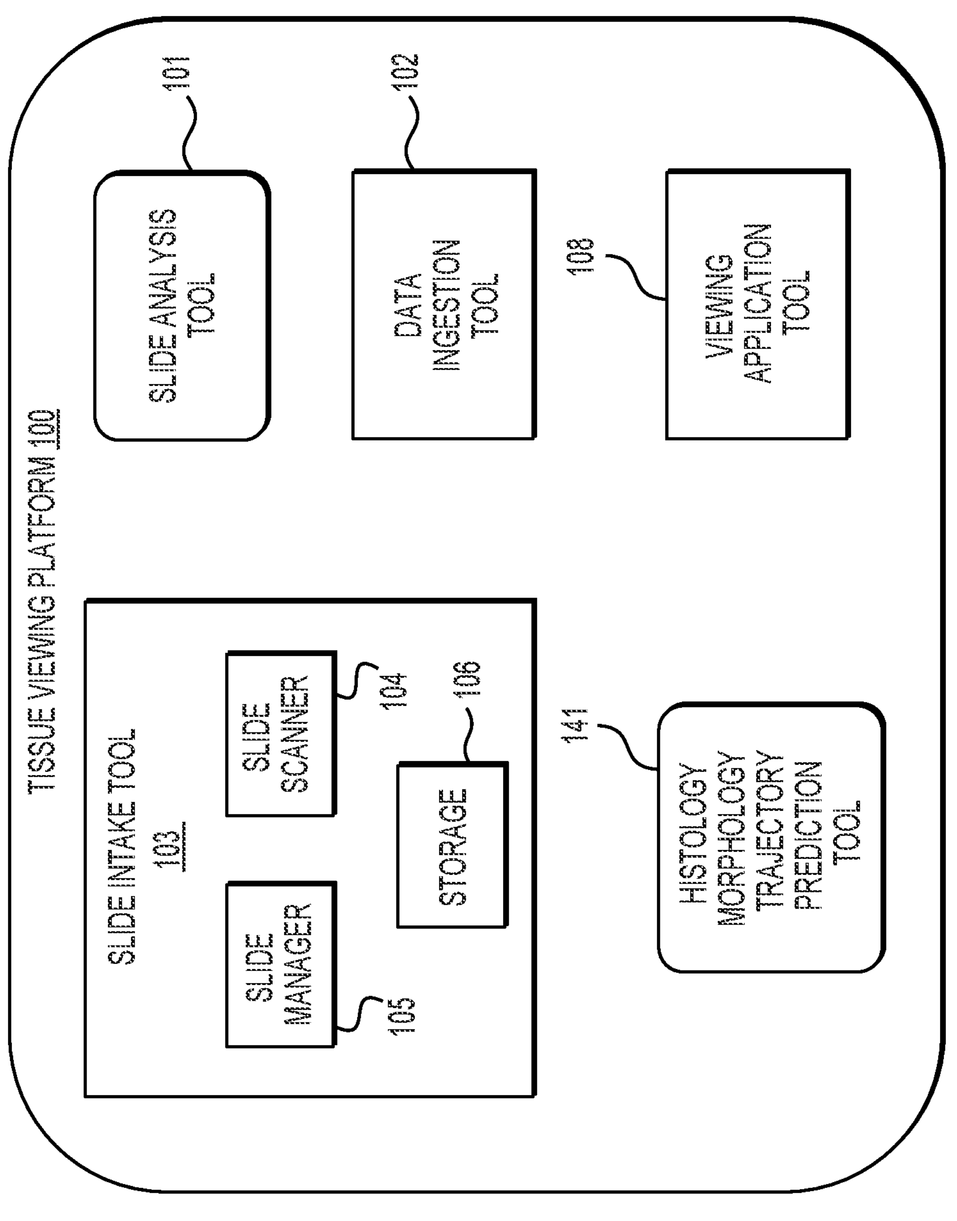
FIG. 1B illustrates an exemplary block diagram of a tissue viewing platform according to techniques presented herein.

FIG. 1B illustrates an exemplary block diagram of the tissue viewing platform 100. For example, the tissue viewing platform 100 may include a slide analysis tool 101, a histology morphology trajectory prediction tool 141, a data ingestion tool 102, a slide intake tool 103, a slide scanner 104, a slide manager 105, a storage 106, and a viewing application tool 108.

The slide analysis tool 101, as described below, refers to a process and system for processing digital images associated with a tissue specimen (e.g., digitized images of slide-mounted histology or cytology specimens), and using machine learning to analyze a slide, according to an exemplary embodiment.

The histology morphology trajectory prediction tool 141, as described in greater detail below, refers to a process and system for processing digital pathology slides (e.g., digitalized images of a slide-mounted history or cytology specimens), and using machine learning or a rules based system for determining a prediction of the trajectory of histological morphology. Predicted histological morphologies may include cell or tissue characteristics associated with a given disease, a grade, phase, stage, and/or severity associated with a disease, and/or the like.

The data ingestion tool 102 refers to a process and system for facilitating a transfer of the digital pathology images to the various tools, modules, components, and devices that are used for classifying and processing the digital pathology images, according to an exemplary embodiment.

The slide intake tool 103 refers to a process and system for scanning pathology images and converting them into a digital form, according to an exemplary embodiment. The slides may be scanned with slide scanner 104, and the slide manager 105 may process the images on the slides into digitized pathology images and store the digitized images in storage 106.

The viewing application tool 108 refers to a process and system for providing a user (e.g., a pathologist) with specimen property or image property information pertaining to digital pathology image(s), according to an exemplary embodiment. The information may be provided through various output interfaces (e.g., a screen, a monitor, a storage device, and/or a web browser, etc.).

The slide analysis tool 101 and histology morphology trajectory prediction tool 141, and each of its components, may transmit and/or receive digitized slide images and/or patient information to server systems 110, physician servers 121, hospital servers 122, clinical trial servers 123, research lab servers 124, and/or laboratory information systems 125 over an electronic network 120. Further, server systems 110 may include one or more storage devices 109 for storing images and data received from at least one of the slide analysis tool 101, the histology morphology trajectory prediction tool 141, the data ingestion tool 102, the slide intake tool 103, the slide scanner 104, the slide manager 105, and viewing application tool 108. Server systems 110 may also include processing devices for processing images and data stored in the storage devices. Server systems 110 may further include one or more machine learning tool(s) or capabilities, e.g., due to the processing devices. Alternatively or in addition, the present disclosure (or portions of the system and methods of the present disclosure) may be performed on a local processing device (e.g., a laptop).

Any of the above devices, tools and modules may be located on a device that may be connected to an electronic network 120, such as the Internet or a cloud service provider, through one or more computers, servers, and/or handheld mobile devices.

Figure 1C:
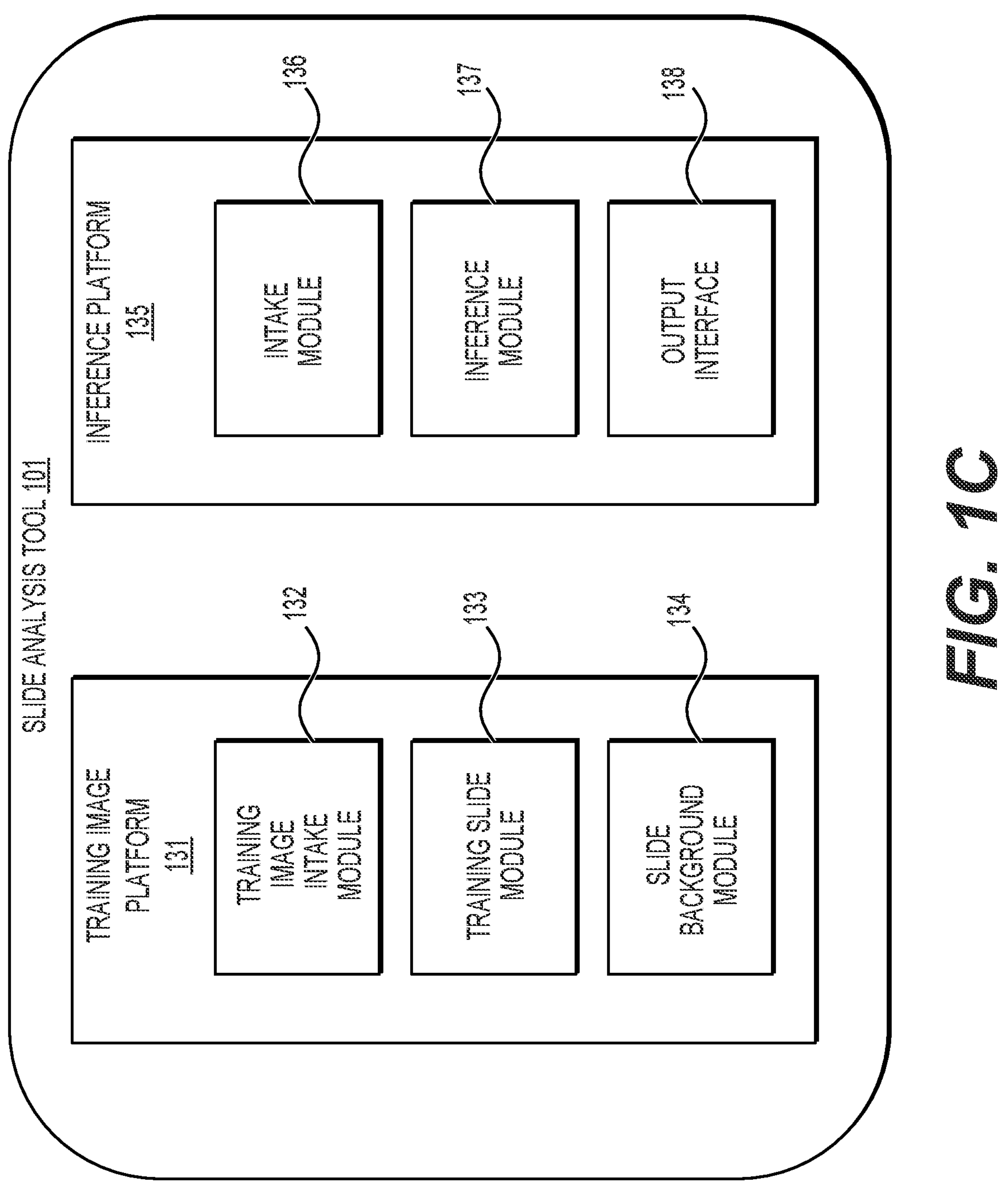
FIG. 1C illustrates an exemplary block diagram of a slide analysis tool, according to techniques presented herein.

FIG. 1C illustrates an exemplary block diagram of a slide analysis tool 101, according to an exemplary embodiment of the present disclosure. The slide analysis tool may include a training image platform 131 and/or a inference platform 135.

The training image platform 131, according to one embodiment, may create or receive training images that are used to train a machine learning system to effectively analyze and classify digital pathology images. For example, the training images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized image samples from a 3D imaging device, such as micro-CT.

The training image intake module 132 may create or receive a dataset comprising one or more training images corresponding to either or both of images of a human and/or animal tissue and images that are graphically rendered. For example, the training images may be received from any one or any combination of the server systems 110, physician servers 121, and/or laboratory information systems 125. This dataset may be kept on a digital storage device. The training slide module 133 may intake training data that includes images and corresponding information. For example, training slide module 133 training data may include receiving one or more images (e.g., WSIs) of a human or animal. This dataset may be kept on a digital storage device. In some examples, the dataset may be comprised of a plurality of data subsets, where each data subset corresponds to a training case from a plurality of training cases and includes one or more training images from the training case. The training slide module 133 may include one or more computing devices capable of, e.g., determining whether the training images have a sufficient level-of-quality for training a machine learning model. The training slide module 133 may further include one or more computing devices capable of, e.g., identifying whether a set of individual cells belong to a cell of interest or a background of a digitized image.

The slide background module 134 may analyze images of tissues and determine a background within a digital pathology image. It is useful to identify a background within a digital pathology slide to ensure tissue segments are not overlooked.

According to one embodiment, the inference platform 135 may include an intake module 136, an inference module 137, and an output interface 138. The inference platform 135 may receive a plurality of electronic images/additional information and apply one or more machine learning model to the received plurality of electronic images/information to extract relevant information and integrate spatial and orientation information for display on medical digital images. For example, the plurality of electronic images or additional information may be received from any one or any combination of the server systems 110, physician servers 121, hospital servers 122, clinical trial servers 123, research lab servers 124, and/or laboratory information systems 125. The intake module 136 may receive WSI's corresponding to one or more patients/individuals. Further, the WSI's may correspond to an animal. The intake module 136 may further receive age, ethnicity, and ancillary test results and biomarkers such as genomic/epigenomic/transcriptomic/proteomic/microbiome information can also be ingested, e.g., point mutations, fusion events, copy number variations, microsatellite instabilities (MSI), or tumor mutation burden (TMB). The inference module 137 may apply one or more machine learning models to a group of WSI and any additional information in order to extract relevant information and integrate spatial and orientation information for display on medical images. The inference module 137 may further incorporate the spatial characteristics of the salient tissue into the prediction.

The output interface 138 may be used to output information about the inputted images and additional information (e.g., to a screen, monitor, storage device, web browser, etc.). The output information may include information related to ranking causes of death. Further, output interface 138 may output WSI's that indicate locations/salient regions that include evidence related to outputs from inference module 137.

Techniques discussed herein may use AI technology, machine learning, and/or image processing tools applied to predict histological morphology trajectories and/or images representing the histological morphology trajectories that account for the wide variety of factors influencing such trajectories. These techniques include, but are not limited to, predicting current histological morphology and/or images representing the current histological morphology at a current time point, and/or predicting future histological morphology and/or images representing the future histological morphology at multiple time points in the future (e.g., predicting a future evolution of neoplasms). In some examples, in addition to digital images associated with the tissue and/or organ of interest and patient clinical data, one or more non-invasive measurements that may influence the trajectory may be collected from devices of the patient and/or environment monitoring stations, among other examples, and provided as input (e.g., as variables) to a machine learning system trained to perform the above described predictions.

In some aspects, the predictions may be input to a visualization system that allows a user (e.g., a pathologist) to see an evolution of the histological morphology trajectories over time and/or adjust the factors (e.g., the variables)

to understand how factors may, individually or in combination, influence the evolution to inform patient monitoring, treatments, and/or lifestyle recommendations to slow progression of the disease. As one non-limiting, illustrative example, the predictions may indicate a confidence that a neoplasm, such as atypical ductal hyperplasia (ADC) identified in a patient's breast tissue, may become ductal carcinoma in situ (DCIS) or invasive ductal carcinoma (IDC) at various temporal intervals in the future. These predictions may be used as one factor in determining whether and/or what type of treatment should be implemented. For example, if the neoplasm is predicted to become invasive so far into the future that, based on the current age of the patient and how long the patient is expected to live, the patient is likely to be deceased of other causes before the neoplasm becomes invasive, treatment might not be recommended. Additionally or alternatively, the predictions may be input to an alert generation system that automatically generates and transmits notifications to healthcare professionals and/or patients to indicate a follow-up appointment, screening, or procedure is to be scheduled based on the predicted current and/or future histological morphology trajectories.

Techniques discussed herein may use AI technology, machine learning, and/or image processing tools applied to digital images, patient clinical data, and/or noninvasive measurements associated with patient health and/or environmental factors to predict a trajectory of histological morphology. The trajectory may include a prediction of a current state of the histological morphology and/or one or more future states of the histological morphology.

Figure 2:
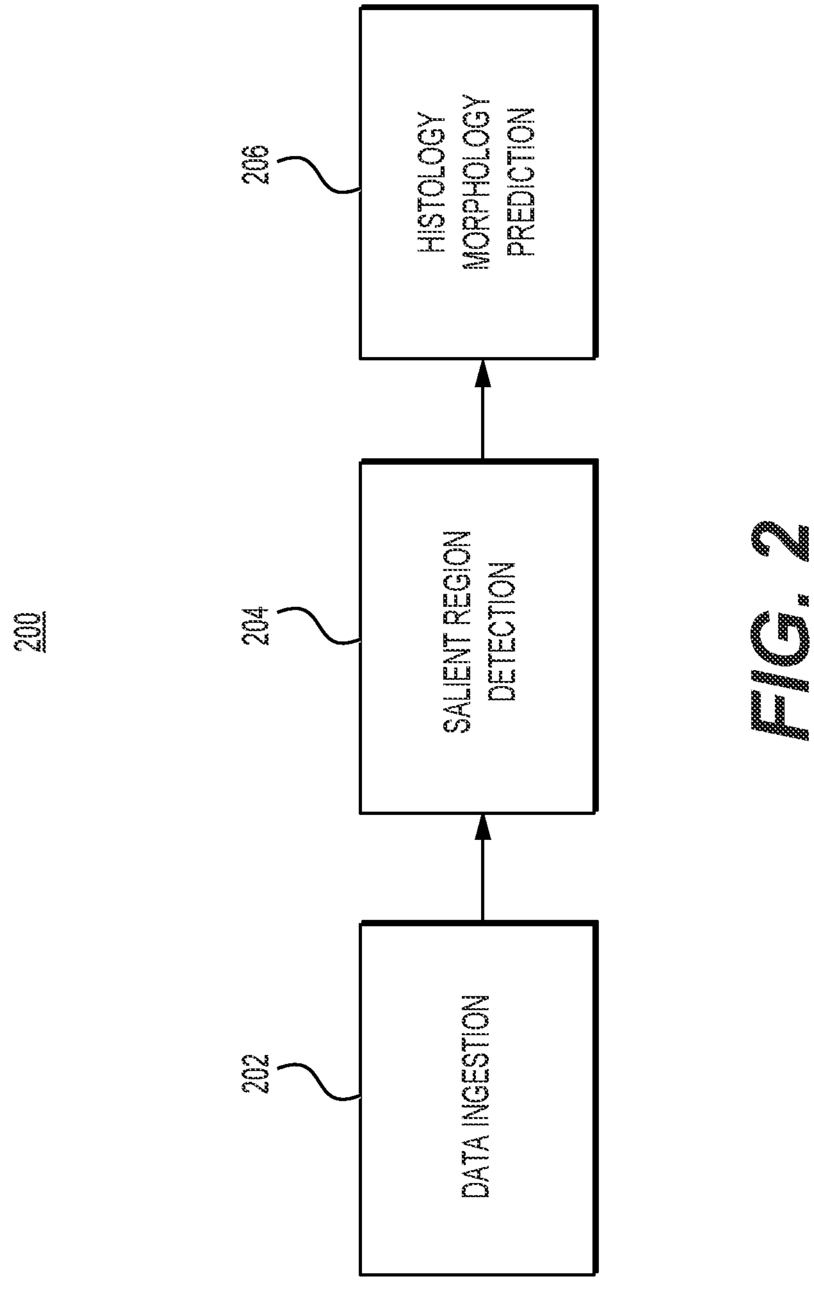
FIG. 2 illustrates an exemplary process for a histological morphology trajectory prediction, according to techniques presented herein.

FIG. 2 illustrates an exemplary process 200 for a histological morphology trajectory prediction, according to techniques presented herein. The systems and methods disclosed herein may include data ingestion 202, a salient region detection module 204, and a histology morphology prediction module 206. The process described in FIG. 2 may be performed by the slide analysis tool 101. In other examples, aspects of the system described in FIG. 2 may be performed in external systems and received by the slide analysis tool 101.

In FIG. 2, the system may a first include data ingestion 202. Data ingestion 202 may be performed by the slide analysis tool 101. Data injection may include receiving one or more digital images (e.g., whole slide image (WSI) of histopathological slide, magnetic resonance imaging (MRI), computed tomography (CT), positron emission tomography (PET), mammogram, ultrasound, X-rays, photographs of external anatomy, etc.) into a digital storage device 109 (e.g., hard drive, network drive, cloud storage, RAM, etc.). The one or more digital images may include one or more WSIs of histopathological slides prepared from tissue extracted during one or more biopsies and/or one or more resections of a given organ of a patient. Additionally or alternatively, digital images received may include images of the organ and/or region of the organ including an area of interest (e.g., an area having abnormal tissue and/or from which tissue is going to be or has been extracted as part of a biopsy or resection). In some examples, the digital images of the data ingested may be pre-processed. The data ingestion module 202 may also receiving patient clinical data, such as test results (e.g., blood tests, genomic tests, etc.), diagnosis, treatment(s) (e.g., including type of treatment(s) and dosage, if applicable), any known outcomes (e.g., remission, recurrence, survival, death), and the like. Optionally, the data ingestion module 202 may also receiving non-invasive measurements associated with a patient's health and/or environment. For example, heart rate, blood measurements (e.g., blood pressure, blood sugar levels), activity, and/or diet-related measurements may be received from patient devices, including from a wearable devices. Additionally, environmental data, such as temperature, ultraviolet (UV) index, air quality index (AQI), nitrogen dioxide levels, particulate matter levels, water quality levels, and population density, that are collected by other entities (e.g., via environmental monitoring stations) and stored in external databases may be obtained for a location of the patient. The location of the patient may be determined based on a global positioning system (GPS) location of the patient's device.

Next, data ingested may be inserted into a salient region detection module 204 as described in greater detail below. A salient region detection module 204, as further described below, may be used to identify the salient regions to be analyzed for each digital image. This may be done manually by a human or automatically using AI/ML. An entire image or specific image regions can be considered salient. Salient region determination techniques are discussed in U.S. application Ser. No. 17/313,617, which is incorporated by reference herein in its entirety.

Next, the digital medical images from the data ingestion module 202, which may or not have had a salient region identified, may be provided to a histology morphology prediction module 206 (e.g., the histology morphology trajectory prediction tool 141). The histology morphology prediction module 206 may implement a trained machine learning system to predict one or more histological morphologies at a current time point and/or one or more future time points. In some examples, the trained machine learning system may predict images representing the one or more histological morphologies at the time point(s). That is, the predicted images may be generated artificial images that represent the predicted histological morphologies. The predicted histological morphologies may include cell or tissue characteristics associated with a given disease, a grade, phase, stage, and/or severity associated with a disease, and/or the like. The digital images, patient clinical data, and/or noninvasive measurements associated with the patient's health and/or environment received by the data ingestion module may be provided as input to the trained machined learning system. In some examples, the trained machine learning system may be a general adversarial network (GAN). The predicted histological morphologies and/or images representing the one or more histological morphologies output by the trained machine learning system may be stored in an electronic storage device.

The optional salient region detection module 204 and the histology morphology prediction module 206 are described further below.

One aspect of the systems and methods disclosed herein includes the automatic identification of one or more salient regions to be analyzed for a digital image using AI/ML. An entire image or specific image regions may be considered salient. The salient region may be assigned a continuous score of interest.

The continuous score of interest may be specific to certain structures within the digital image, and it can be important to identify relevant regions so that they can be included while excluding irrelevant ones. Salient region identification can enable the downstream machine learning system to learn how to detect histological morphologies from less annotated data and to make more accurate predictions.

The salient region detection module 204 can output a salient region selection that was specified by a human annotator using an image segmentation mask, a bounding box, line segment, point annotation, freeform shape, or a polygon, or any combination of the aforementioned. Alternatively, this module can be created using machine learning to identify the appropriate locations.

As described in more detail below with respect to the steps performed to train one or more machine learning systems to identify one or more salient regions of a digital image, there are multiple approaches to using machine learning to create a salient region detector. One approach includes strongly supervised methods that identify precisely where the histological morphology of interest could be found. Another approach includes weakly supervised methods that do not provide a precise location.

For strongly supervised training, the system needs the image and the location of the salient regions including the histological morphology of interest as input. For 2D images, e.g., WSIs, 2D ultrasound, X-rays, and photographs, these locations could be specified with pixel-level labeling, bounding box-based labeling, polygon-based labeling, or using a corresponding image where the saliency has been identified (e.g., using immunohistochemical (IHC) staining). For 3D images, e.g., CT and MRI scans, the locations could be specified with voxel-level labeling, using a cuboid, etc., or use a parameterized representation allowing for subvoxel-level labeling, such as parameterized curves or surfaces, or deformed template. For weakly supervised training, the system requires the image or images and the presence/absence of the salient regions, but the exact location of the salient location does not need to be specified.

The training of the salient region detection module 204 may be described in greater detail below. Examples of training the salient region detection module 204 may include method 300 of FIG. 3A. Examples of using the salient region detection module 204 may include method 350 of FIG. 3B.

Figures 3A, 3B:
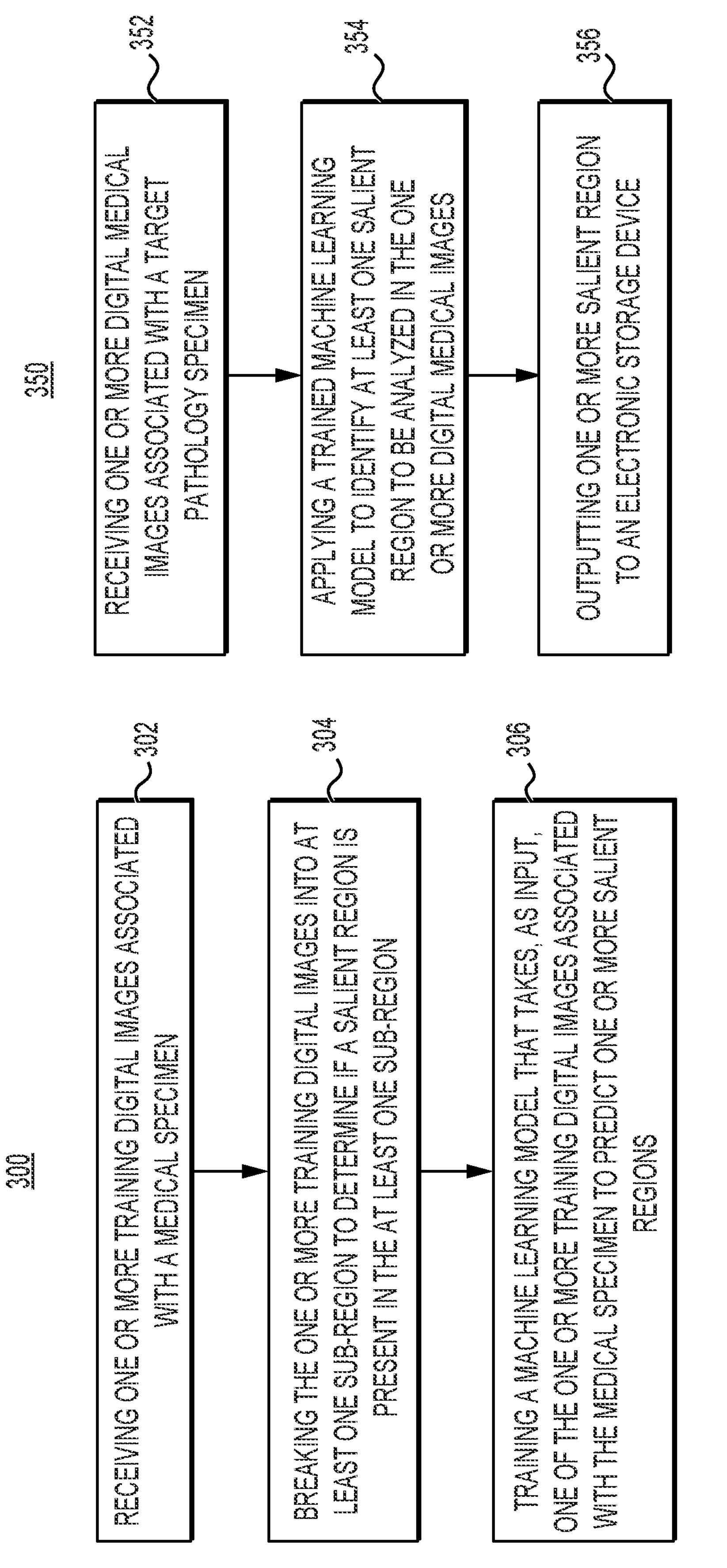
FIG. 3A is a flowchart illustrating an example method of training an algorithm for region detection, according to an exemplary embodiment of the present disclosure.
FIG. 3B is a flowchart illustrating an exemplary method of utilizing an algorithm for region detection, according to an exemplary embodiment of the present disclosure.

FIG. 3A is a flowchart illustrating an example method 300 of training an algorithm for region detection, according to an exemplary embodiment of the present disclosure. The method 300 of FIG. 3A depicts steps that may be performed by, for example, the slide analysis tool 101 or histology morphology trajectory prediction tool 141 as described above in FIG. 1C. Alternatively, the method may be performed by an external system. According to one example aspect, for training the one or more machine learning systems to identify one or more salient regions of a digital image, the following method 300 may be performed:

At step 302, the system may receive one or more digital images of a medical specimen (e.g., histopathological slide images, CT, MRI, PET, mammogram, ultrasound, X-rays, photographs of external anatomy, etc.) into a digital storage device (e.g., hard drive, network drive, cloud storage, RAM, etc.) and an indication of the presence or absence of the salient region (e.g., a particular organ, tissue, region of tissue, etc.) within the image.

At step 304, the system may, break each digital image into sub-regions that may then have their saliency determined. Regions can be specified in a variety of methods, including creating tiles of the image, segmentations based on edge/contrast, segmentations via color differences, segmentations based on energy minimization, supervised determination by the machine learning model, EdgeBoxes, etc.

At step 306 a machine learning system may be trained that takes as input a digital image and predicts whether the salient region is present or not. Training the salient region detection module may also include training a machine learning system to receive, as an input, a digital image and to predict whether the salient region is present or not. Many methods may be used to learn which regions are salient, including but not limited to weak supervision, bounding box or polygon-based supervision, or pixel-level or voxel-level labeling.

Weak supervision may involve training a machine learning model (e.g., multi-layer perceptron (MLP), convolutional neural network (CNN), transformers, graph neural network, support vector machine (SVM), random forest, etc.) using multiple instance learning (MIL). The MIL may use weak labeling of the digital image or a collection of images. The label may correspond to the presence or absence of a salient region.

Bounding box or polygon-based supervision may involve training a machine learning model (e.g., R-CNN, Faster R-CNN, Selective Search, etc.) using bounding boxes or polygons. The bounding boxes or polygons may specify sub-regions of the digital image that are salient for detection of the presence or absence of a biomarker, morphology, etc.

Pixel-level or voxel-level labeling (e.g., semantic or instance segmentation) may involve training a machine learning model (e.g., Mask R-CNN, U-Net, fully convolutional neural network, transformers, etc.) where individual pixels and/or voxels are identified as being salient for the detection of continuous score(s) of interest. Labels could include in situ tumor, invasive tumor, tumor stroma, fat, etc. Pixel-level/voxel-level labeling may be from a human annotator or may be from registered images that indicate saliency.

According to another example aspect, to implement the one or more trained machine learning systems for identifying one or more salient regions in a digital image, the following steps may be performed, as described below.

FIG. 3B is a flowchart illustrating methods for how to provide image region detection, according to one or more exemplary embodiments herein. FIG. 3B may illustrate a method that utilizes the neural network that was trained in FIG. 3A. The exemplary method 350 (e.g., steps 352-356) of FIG. 3B depicts steps that may be performed by, for example, by the slide analysis tool 101. These steps may be performed automatically or in response to a request from a user (e.g., physician, pathologist, etc.). Alternatively, the method described in flowchart 350 may be performed by any computer process system capable of receiving image inputs such as device 1000 and capable of including or importing the neural network described in FIG. 3A.

At step 352, a system may receive one or more digital medical images may be received of a medical specimen into a digital storage device (e.g., hard drive, network drive, cloud storage, RAM, etc.). Using the salient region detection module may optionally include breaking or dividing each digital image into sub-regions and determining a saliency (e.g., sub-regions of tissue which has morphology of interest) of each sub-region using the same approach from training step 304.

At step 354, the trained machine learning system from FIG. 3A may be applied to the inputted images to predict which regions of the image are salient and could potentially exhibit the continuous score(s) of interest.

At step 356, if salient regions are found at step 354, the system may identify the salient region locations and flag them. If salient regions are present, detection of the region can be done using a variety of methods, including but not restricted to: running the machine learning model on image sub-regions to generate the prediction for each sub-region; or using machine learning visualization tools to create a detailed heatmap, etc. Example techniques are described in U.S. application Ser. No. 17/016,048, filed Sep. 9, 2020, and Ser. No. 17/313,617, filed May 6, 2021, which are incorporated herein by reference in their entireties. The detailed heatmap may be created by using class activation maps, GradCAM, etc. Machine learning visualization tools may then be used to extract relevant regions and/or location information.

The outputted salient regions from step 356, may then be fed into the histology morphology prediction module 206. The training of the histology morphology prediction module 206 may be described in greater detail below. Examples of training the histology morphology prediction module 206 may include method 400 of FIG. 4A and method 500 of FIG. 5A. Examples of using the histology morphology prediction module 206 may include method 450 of FIG. 4B and method 550 of FIG. 5B.

Another aspect of the systems and methods disclosed herein includes using AI technology, machine learning, and/or image processing techniques to predict a histological morphology trajectory at one or more time points (e.g., current and/or into the future). For example, the histological morphology trajectory may be the highest likelihood outcome of a morphology prediction at multiple future time points (as shows in FIG. 7A-7D). The trajectory may be modeled by a vector. The model described herein may be capable of generating a prediction and expected image at any selected time point. For example, a pathologist may be able to input one or more time points to see predictions for various selected time points. A trajectory vector may define a likeliest path (e.g., prediction) for a given patient. The predicted images at various points of the vector may semantically show a direction of disease progression similar to the actual progression that a patient may have. The outputted model may be a close estimate to a future time point measurement. The predicted trajectory may include estimated values of observed variables such as images or test results at various time points. In one example, the trajectory vector may not be outputted to a user, but rather internally used by the system. In another example, the trajectory vector may be output to a user. In some examples, an image representing the histological morphology trajectory may be predicted.

Figure 4A:
FIG. 4A is a flowchart illustrating an example method of training a histology morphology trajectory prediction module according to an exemplary embodiment of the present disclosure.

FIG. 4A is a flowchart illustrating an example method 400 of training a histology morphology trajectory prediction module according to an exemplary embodiment of the present disclosure. The method 400 of FIG. 4A depicts steps that may be performed by, for example, the histology morphology prediction module 206 as described above. Alternatively, the method 400, or certain steps thereof, may be performed by an external system.

At step 402, the system may receive training data at a digital storage device 109 (e.g., hard drive, network drive, cloud storage, RAM, etc.). The training data may include a plurality of training data subsets. Each training data subset may represent data from a plurality of time points throughout a patient journey (e.g., from screening to diagnosis to treatment, if any, to outcome) for a patient having been monitored for a particular type of disease, such as a particular type of cancer, affecting one or more organs. The training data subset may include digital images. The digital images may include one or more WSIs of histopathological slides prepared from tissue extracted during one or more biopsies and/or one or more resections of the affected organ(s) of the patient throughout the patient journey. Additionally or alternatively, the digital images may also include other types of images (e.g., MRI, CT, PET, mammogram, ultrasound, X-ray, photographs of external anatomy such as skin) of the affected organ(s) and/or region of the affected organ(s) from which the tissue is extracted and/or resected. In some examples, the digital images may be annotated. The training data subset may also include data patient clinical data, such as screening measures taken, diagnosis, treatment (s) (e.g., including type of treatment(s) and dosage, if applicable), outcomes (e.g., remission, recurrence, survival, death), and the like. Optionally, the training data subset may also include non-invasive measurements associated with the patient's health and/or environment that were collected throughout the patient journey from the patient's devices and/or external resources (e.g., external monitoring stations).

At step 404, the system may use the salient region detection module 204 described elsewhere herein to identify the saliency of each region within the digital images and exclude non-salient image regions from subsequent processing.

At step 406, the system may generate and train the machine learning system using the training data. For example, the machine learning system may use the plurality of training data subsets to learn how histological morphology changes over time (e.g., a histological morphology trajectory) based on ground truth labels, e.g., the digital image(s), associated patient clinical data and, if available, the noninvasive measurements associated with the patient's health and environment, in order to predict one or more unknown histological morphologies and/or an image (e.g., an artificial WSI) representing the one or more unknown histological morphologies at a current time point and/or future time point(s). The training data may comprise morphology images of multiple time points for given patients, which may allow the machine learning system to learn associations between earlier and later morphologies, prognosis, recurrence timelines, diagnosis, mortality risk, etc. These morphology images may be paired with ground truth data at each time point, which may comprise measurements, biomarkers, tissue types, tissue morphology classifications, cancer or other disease status, pathological information, stain information, drug treatment information, blood measurements, lipid panel measurements, multi modal and multiomic measurements, outcome, survival, etc. For example, each data type within the training data subsets may be an input variable of the machine learning system for which an associated weight is learned, the associated weight indicating an importance or effect of that given input variable on the output (e.g., on the histological morphology trajectory or other ground truth labels). The weight for a given variable may be dependent on the type of disease being monitored. For example, noninvasive measurements associated with air quality in the patient's environment may be more influential for lung cancer than for prostate cancer. The machine learning system may be a generative adversarial network (GAN). The histological morphologies and/or images predicted may be associated with a particular region of the tissue, such as an area surrounding the site of biopsy or resection or may be associated with the whole organ tissue (e.g., if input data includes multiple digital images of varying locations of the organ).

In one example, when the machine learning system is a GAN and images representing the histological morphologies are predicted, the following additional steps may be performed to train the machine learning system: (a) define a generator and discriminator network architecture; (b) train the generator model to generate artificial images (e.g., artificial WSIs) using the inputs and ground truth labels described above; (c) train the discrimination model to distinguish between the artificial images (e.g., artificial WSIs) generated from the generator and real images (e.g. real WSIs) from the training data. In some examples, the discriminator network may be a convolutional neural network image classifier.

At step 408, the trained machine learning system in digital storage (e.g., digital storage 109) for subsequent use.

Figure 4B:
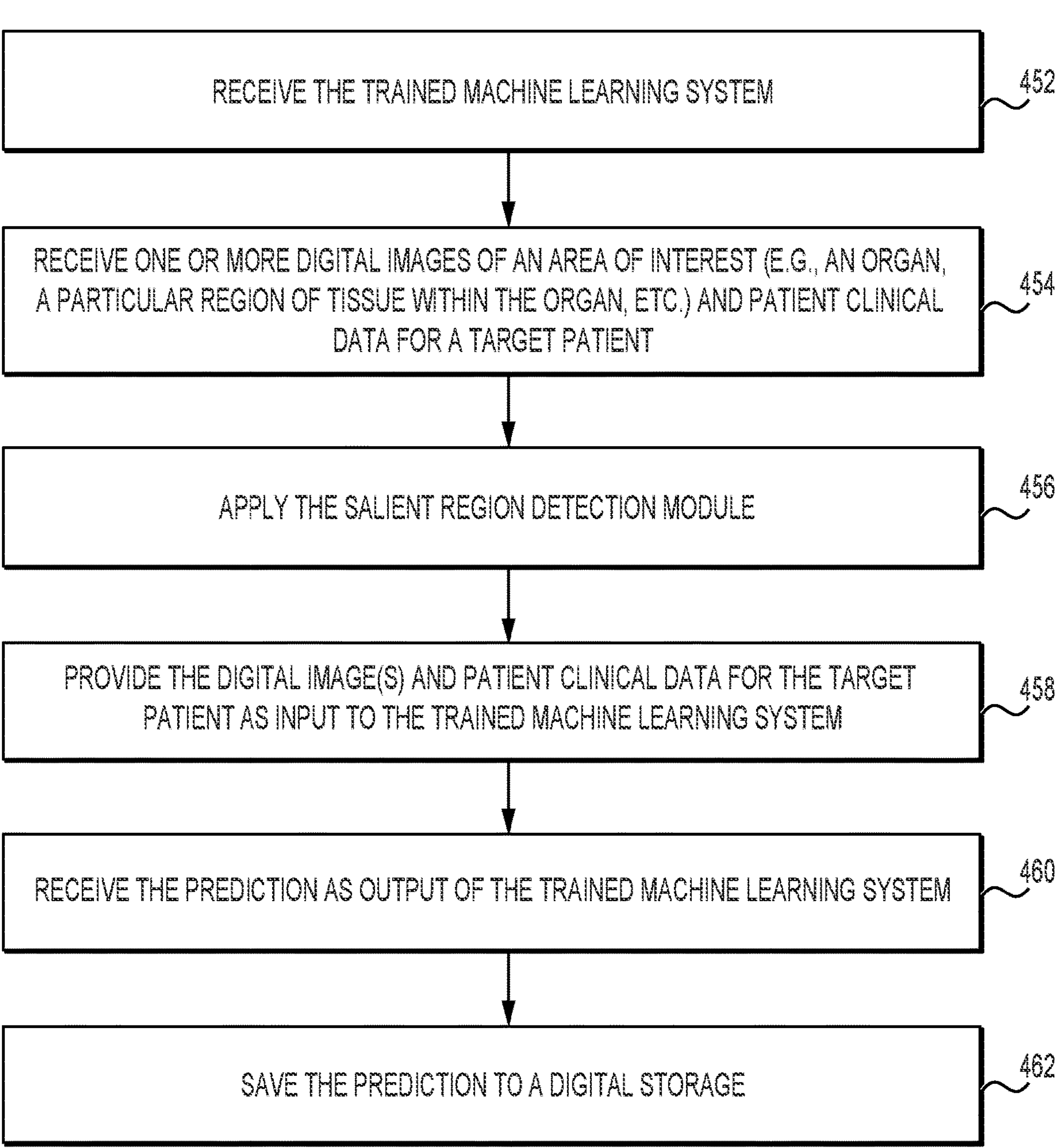
FIG. 4B is a flowchart illustrating an exemplary method of utilizing a histology morphology trajectory prediction according to an exemplary embodiment of the present disclosure.

FIG. 4B is a flowchart illustrating an exemplary method of performing a histology morphology trajectory prediction according to an exemplary embodiment of the present disclosure. The exemplary method 450 (e.g., steps 452-462) of FIG. 4B depicts steps that may be performed by, for example, by the histology morphology trajectory prediction tool 141. These steps may be performed automatically or in response to a request from a user (e.g., physician, pathologist, etc.). These steps may describe an exemplary method of how to use the trained system described in FIG. 4A. Alternatively, the method described in flowchart 450 may be performed by any computer process system capable of receiving image inputs such as device 1000 and capable of including or importing the neural network described in FIG. 4A.

According to one example aspect, to implement the trained machine learning system to predict one or more histological morphologies and/or image(s) representing the histological morphologies at a current time point and/or future time point(s).

At step 452, the system may determine a trained machine learning system. For example, the trained learning system may be the machine learning system described in FIG. 4A. The trained system may perform a histology morphology trajectory prediction. In one example, the trained system may be implemented by the histology morphology trajectory prediction tool 141. In another example, the trained machine learning system may be imported through network 120.

At step 454, the trained system may receive one or more digital images of an area of interest (e.g., an organ, a particular region of tissue within the organ, etc.) and patient clinical data for a target patient. The digital images may include one or more WSIs of tissue that was biopsied and/or resected. Additionally or alternatively, the digital images may include other types of images of the area of interest, such as MRI, CT, PET, mammogram, ultrasound, X-rays, photographs of external anatomy, etc. Optionally, noninvasive measurements associated with the target patient's health and/or environment may also be received. The measurements may be received from one or more devices of the target patient, and/or external resources based on a location obtained from the patient's device(s). For example, heart rate, blood measurements (e.g., blood pressure, blood sugar levels), activity, and/or diet-related measurements may be received from target patient devices, including wearable devices. The wearable devices may be capable of recording heart rate measurements, blood measurement, physical activity, and/or any diet related information. This information may be exported in live time to the trained system. Additionally, environmental data, such as temperature, UV index, AQI, nitrogen dioxide levels, particulate matter levels, water quality levels, and population density, that are collected by other entities (e.g., via environmental monitoring stations) and stored in external databases may be obtained for a location of the target patient. The location of the target patient may be determined based on a GPS location of the target patient's device. The location data may be pulled from an external website automatically in response to receiving the patient's location data. The location data may also be outputted by the wearable device of the patient. Optionally, a risk setting may be received. Example risk settings may include the most likely outcome or the worst outcome within X % of best outcomes. An example may be a risk setting of 95% of the possibilities (e.g., within 2 standard deviations). Another exemplary risk setting may include a worst case scenario in the top 75% of outcomes.

At step 456, the system may use the salient region detection module described in FIG. 3A and FIG. 3B to identify the saliency of each region within the digital image (s) received and exclude non-salient image regions from subsequent processing.

At step 458, the digital image(s) and patient clinical data for the target patient may be provided as input to the trained machine learning system determined at step 452. Additionally, the noninvasive measurements associated with the target patient's health and/or environment and/or the risk settings, may be provided to the trained machine learning system if optionally received. Based on the input, the trained machine learning system may at least predict one or more histological morphologies at a current and/or future time point (e.g., predict a current histological morphology trajectory). The predicted one or more histological morphologies may be in accordance with the risk setting provided as input or a default risk setting (e.g., the most likely outcome or the worst outcome, among other examples). A probability may be associated with each of the one or more histological morphologies predicted. In some examples, the trained machine learning system may predict an image representing the current histological morphology trajectory. Additionally or alternatively, in some aspects, the machine learning system may predict one or more histological morphologies at one or more future time points (e.g., predict histological morphology trajectories over time). For example, a likeliest development of the input variables at the future times points may be estimated (e.g., using a confidence interval of a mean for each variable based on historical data for the target patient) and provided as input to the to the machine learning system to predict one or more histological morphologies for the future time points in accordance with the risk setting (e.g., provided as input or a default risk setting). In some examples, the trained machine learning system may predict images representing the histological morphology trajectories over time. By predicting histological morphologies for the future time points, a user (e.g., a pathologist) may be enabled to adjust one or more values and/or confidence intervals of the input variables to see how the adjustment to the variable effects how the histological morphology changes over time, as described in more detail below. Additionally, the risk setting may be adjustable. The histological morphologies predicted for the current and/or future time point(s) may be associated with a particular region of the tissue, such as an area surrounding the site of biopsy or resection associated with the one or more WSIs received. In other examples, morphology of the whole organ tissue may be predicted to give macro scale and heterogeneity insights (e.g., if input further includes other WSIs of tissue extracted or resected from different areas of the organ and/or or medical images of varying locations of the organ).

At step 460, the system may receive the prediction as output of the trained machine learning system.

At step 462, the prediction from step 560 may be saved to digital storage (e.g., digital storage 109) and/or output to a user.

The trained machine learning system may be periodically re-run for the target patient at a pre-defined interval. In some examples, the pre-defined interval may be based on a type of disease (e.g., a type of cancer) being monitored for. For example, the pre-defined interval may be shorter for more aggressive cancers such that the trained machine learning system is run more frequently for target patients being monitored for more aggressive cancers, as opposed to cancers that have a slower progression. The pre-defined interval may also be adjusted based on histological morphologies predicted. For example, the pre-defined interval may be shortened if the histological morphologies predicted indicate a likely progression of the disease.

In some examples, the prediction may be transmitted to an electronic health care record system to be included (e.g., stored within) a medical record associated with the target patient. This may include transmitting the prediction by electronic network 120 to either the hospital servers 122, the research lab server 124, laboratory information systems 125, the physician servers 121, or clinical trial servers 123. In further examples, the prediction may be provided as input to other systems. For example, the prediction may be provided as input to a visualization system, described in more detail below, that enables a user (e.g., a pathologist) to visualize and explore how tissue morphology changes over time and what variables may impact those changes to inform patient monitoring, treatments, and/or lifestyle recommendations to slow progression of the disease. As another example, the prediction may be provided as input to an alert generation system, described in more detail below, that automatically generates and transmits one or more notifications to healthcare professionals and/or patients to indicate a follow-up appointment, screening, or procedure is to be scheduled based on the predicted current and/or future histological morphology trajectories.

One example use case or application of one or more of the above-described systems includes predicting trajectories of prostate tissue morphology.

Figure 5A:
FIG. 5A is a flowchart illustrating an example method of training a prostate tissue morphology trajectory prediction module according to an exemplary embodiment of the present disclosure.
Figure 5A:
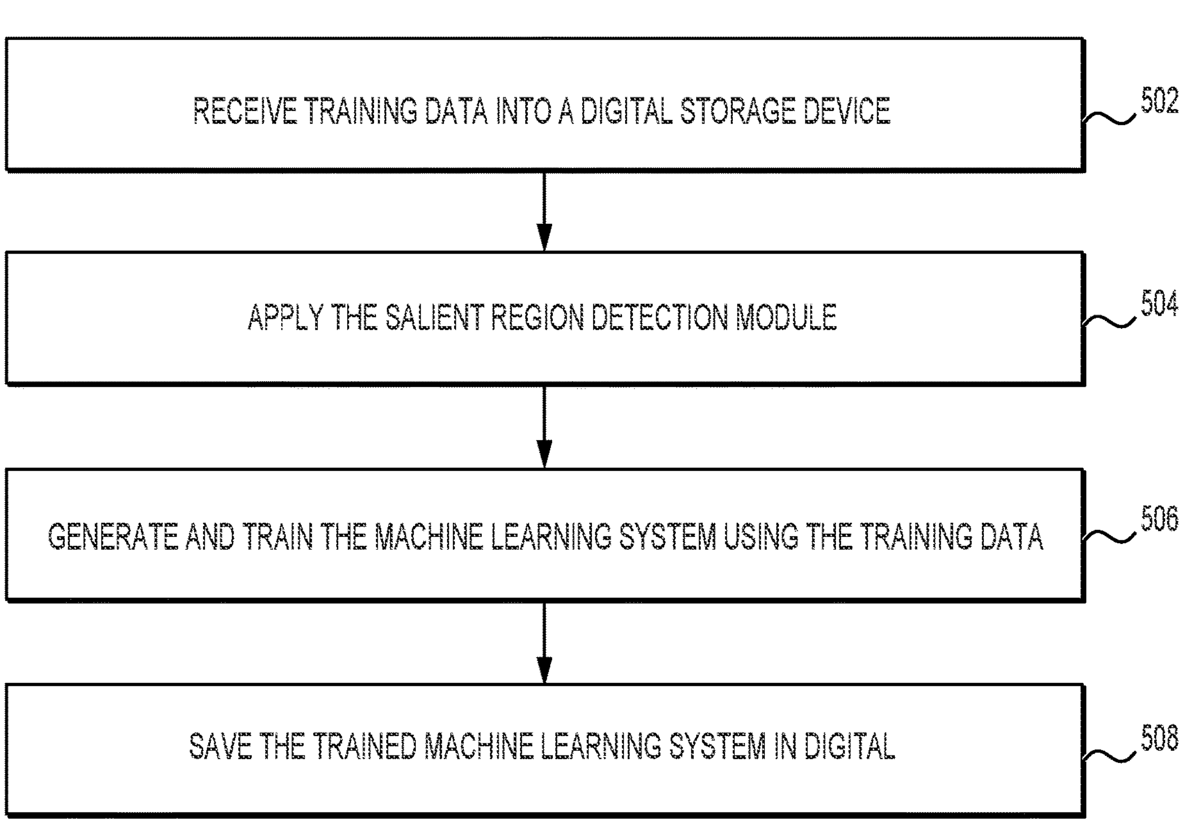

FIG. 5A is a flowchart illustrating an example method 500 of training a prostate tissue morphology trajectory prediction module according to an exemplary embodiment of the present disclosure. The method 500 of FIG. 5A depicts steps that may be performed by, for example, the histology morphology prediction module 206 as described above. Alternatively, the method 500 may be performed by an external system.

At step 502, the system may receive training data into a digital storage device 109 (e.g., hard drive, network drive, cloud storage, RAM, etc.). The training data may include a plurality of training data subsets. The example training data set may be comprised of training data subsets representing patient journeys of a plurality of patients over a period of time, each patient having been monitored for prostate cancer. Each training data subset may include digital images, such as annotated images of histopathological slides from one or more prostate tissue biopsies and/or resections as well as other medical images of the prostate (e.g., ultrasound, CT, MRI, PET). The training data subset may also include patient clinical data, such as diagnoses, treatment type(s), treatment dosage(s) if applicable, laboratory tests (e.g., blood tests, genomic tests), and/or outcome (e.g., remission, recurrence, survival, death, etc.). The training data subset may also include noninvasive measurements collected from devices of the patient's and/or environment monitoring stations, such as heart rate, blood measurements, activity, nutrition, or environmental factors (e.g., temperature, population density, air pollution, and water pollution, sun exposure).

To provide a non-limiting, illustrative example, for a patient included in the training data set, a respective training data subset associated with six time points may be provided as input to train the system. At the first time point, no biopsy had been performed and the data input to the system for the first time point may include any patient clinical data and/or noninvasive measurements collected. At the second time point, a biopsy of prostate tissue was performed from which an abnormality in the prostate tissue was determined to be benign. The data input for the second time point to the system may include a histopathological image of the biopsied prostate tissue annotated with the benign diagnosis along with any other patient data and/or noninvasive collected. At the third time point, another biopsy was performed due to elevated prostate-specific antigen (PSA) levels from which an abnormality in the prostate tissue is determined to be atypical small acinar proliferation (ASAP). The data input for the third time point to the system may include the elevated PSA levels, among other patient data collected, and a histopathological image of the biopsied prostate tissue annotated with the ASAP diagnosis. Based on the ASAP diagnosis, the patient was then more closely monitored and scheduled for a follow-up biopsy at the fourth time point. At the fourth time point, the follow-up biopsy was performed and cancer was detected within the biopsied prostate tissue. The data input for the fourth time input may include a histopathological image of the biopsied prostate tissue annotated with the cancer diagnosis, as well as any other patient clinical data and/or noninvasive measurements collected. Based on the cancer diagnosis, at a fifth time point, a portion of the prostate including the cancerous cells was removed via a resection surgery, and the data input for the fifth time input may include the resection treatment. At the sixth time point, the patient died, and the data input for the sixth time input may include a patient outcome of death. While prostate cancer is discussed above, these techniques may be practiced with breast, lung, colorectal, kidney, endometrial, pancreatic, thyroid, brain, esophageal, stomach, or liver cancer, melanoma, non-hodgkin lymphoma, or any other cancer type.

At step 504, the system may use the salient region detection module 204 described above to identify the saliency of each region within the digital images and exclude non-salient image regions from subsequent processing.

At step 506, the system may generate and train the machine learning system using the training data. For example, the machine learning system may use the plurality of training data subsets to learn how prostate morphology changes over time (e.g., a histological morphology trajectory) based on ground truth labels, e.g., the digital image(s), associated patient clinical data and, if available, the noninvasive measurements associated with the patient's health and environment, in order to predict one or more unknown prostate morphologies and/or an image (e.g., an artificial WSI) representing the one or more unknown prostate morphologies at a current time point and/or future time point(s). Step 506 may include any of the limitations performed at step 406.

At step 508, the trained machine learning system in digital storage (e.g., digital storage 109) for subsequent use.

Figure 5B:
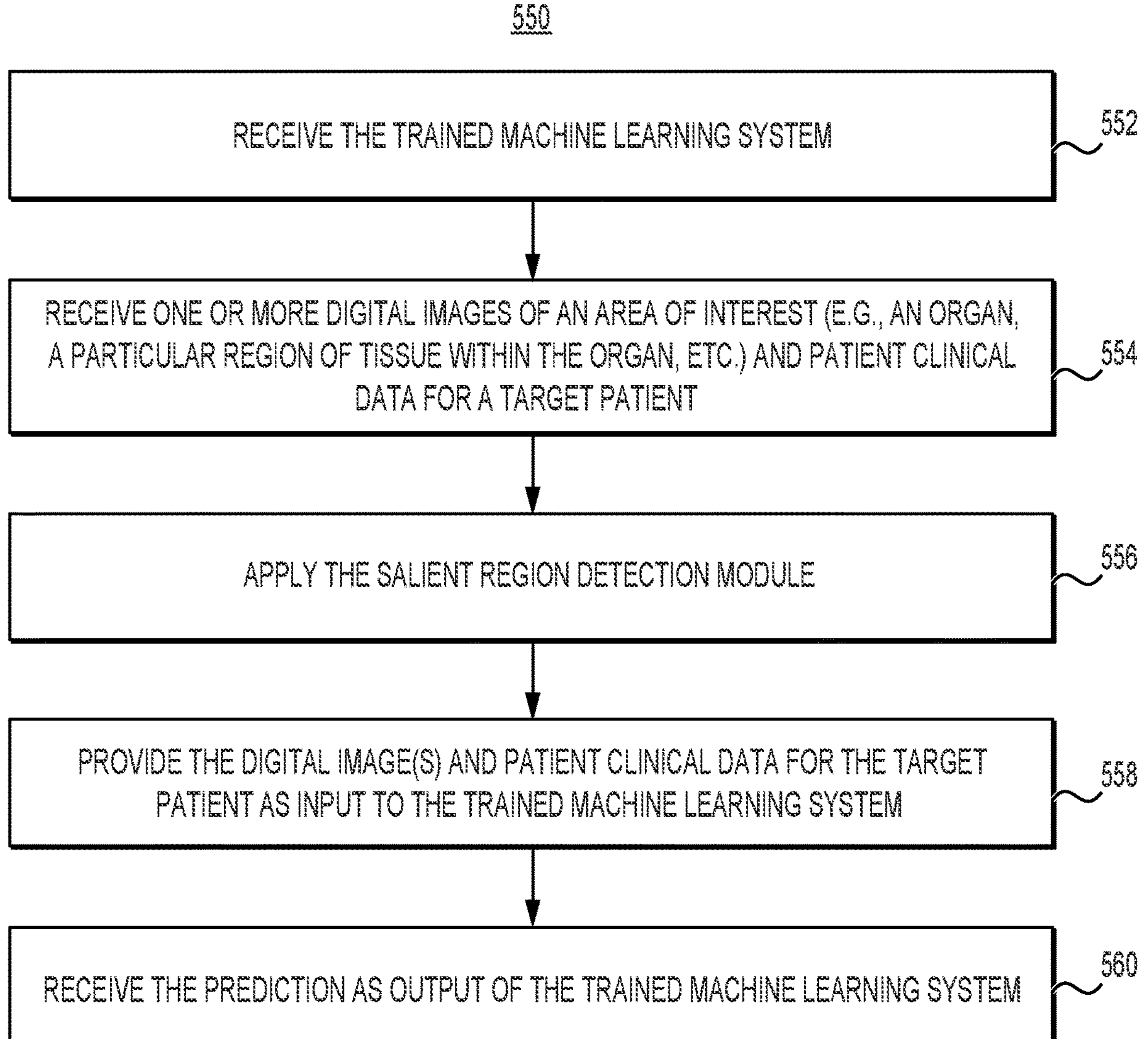
FIG. 5B is a flowchart illustrating an exemplary method of utilizing a prostate tissue morphology trajectory prediction according to an exemplary embodiment of the present disclosure.

FIG. 5B is a flowchart illustrating an exemplary method of performing a prostate morphology trajectory prediction according to an exemplary embodiment of the present disclosure. The exemplary method 550 (e.g., steps 552-562) of FIG. 5B depicts steps that may be performed by, for example, by the histology morphology trajectory prediction tool 141. These steps may be performed automatically or in response to a request from a user (e.g., physician, pathologist, etc.). These steps may describe an exemplary method of how to use the trained system described in FIG. 5A. Alternatively, the method described in flowchart 550 may be performed by any computer process system capable of receiving image inputs such as device 1000 and capable of including or importing the neural network described in FIG. 5A. The machine learning system of method 550 may be implemented to predict a prostate tissue morphology and/or an image representing the prostate tissue morphology for a target patient At step 552, the system may determine a trained machine learning system. For example, the trained learning system may be the machine learning system described in FIG. 5A. The trained system may perform a histology morphology trajectory prediction. In one example, the trained system may be implemented by the histology morphology trajectory prediction tool 141. In another example, the trained machine learning system may be imported through network 120.

At step 554, the trained system may receive one or more digital images of an area of interest (e.g., a prostate) and patient clinical data for a target patient. The digital images may include one or more WSIs of tissue that was biopsied and/or resected. Additionally or alternatively, the digital images may include other types of images of the area of interest, such as MRI, CT, PET, mammogram, ultrasound, X-rays, photographs of external anatomy, etc. Optionally, noninvasive measurements associated with the target patient's health and/or environment may also be received. The measurements may be received from one or more devices of the target patient, and/or external resources based on a location obtained from the patient's device(s). For example, heart rate, blood measurements (e.g., blood pressure, blood sugar levels), activity, and/or diet-related measurements may be received from target patient devices, including wearable devices. Additionally, environmental data, such as temperature, UV index, AQI, nitrogen dioxide levels, particulate matter levels, water quality levels, and population density, that are collected by other entities (e.g., via environmental monitoring stations) and stored in external databases may be obtained for a location of the target patient. The location of the target patient may be determined based on a GPS location of the target patient's device. Optionally, a risk setting may be received. Example risk settings may include the most likely outcome or the worst outcome within 95% of the possibilities (e.g., within 2 standard deviations).

At step 556, the system may use the salient region detection module described in FIG. 3A and FIG. 3B to identify the saliency of each region within the digital image (s) received and exclude non-salient image regions from subsequent processing.

At step 558, the digital image(s) and patient clinical data for the target patient may be provided as input to the trained machine learning system determined at step 552. Additionally, the noninvasive measurements associated with the target patient's health and/or environment and/or the risk settings, may be provided to the trained machine learning system if optionally received. Based on the input, the trained machine learning system may at least predict one or more prostate morphologies at a current time point (e.g., predict a current prostate morphology trajectory). The predicted one or more prostate morphologies may be in accordance with the risk setting provided as input or a default risk setting (e.g., the most likely outcome or the worst outcome, among other examples). A confidence may be associated with each of the one or more histological morphologies predicted. In some examples, the trained machine learning system may predict an image representing the current histological morphology trajectory. Additionally or alternatively, in some aspects, the machine learning system may predict one or more prostate morphologies at one or more future time points (e.g., predict histological morphology trajectories over time). For example, a likeliest development of the input variables at the future times points may be estimated (e.g., using a confidence interval of a mean for each variable based on historical data for the target patient) and provided as input to the to the machine learning system to predict one or more histological morphologies for the future time points in accordance with the risk setting (e.g., provided as input or a default risk setting). In some examples, the trained machine learning system may predict images representing the prostate morphology trajectories over time. By predicting prostate morphologies for the future time points, a user (e.g., a pathologist) may be enabled to adjust one or more values and/or confidence intervals of the input variables to see how the adjustment to the variable effects how the histological morphology changes over time, as described in more detail below. Additionally, the risk setting may be adjustable. The prostate morphologies predicted for the current and/or future time point(s) may be associated with a particular region of the tissue, such as an area surrounding the site of biopsy or resection associated with the one or more WSIs received.

At step 560, the system may receive the prediction as output of the trained machine learning system.

At step 562, the prediction from step 560 may be saved to digital storage (e.g., digital storage 109) and/or output to a user.

Figure 6:
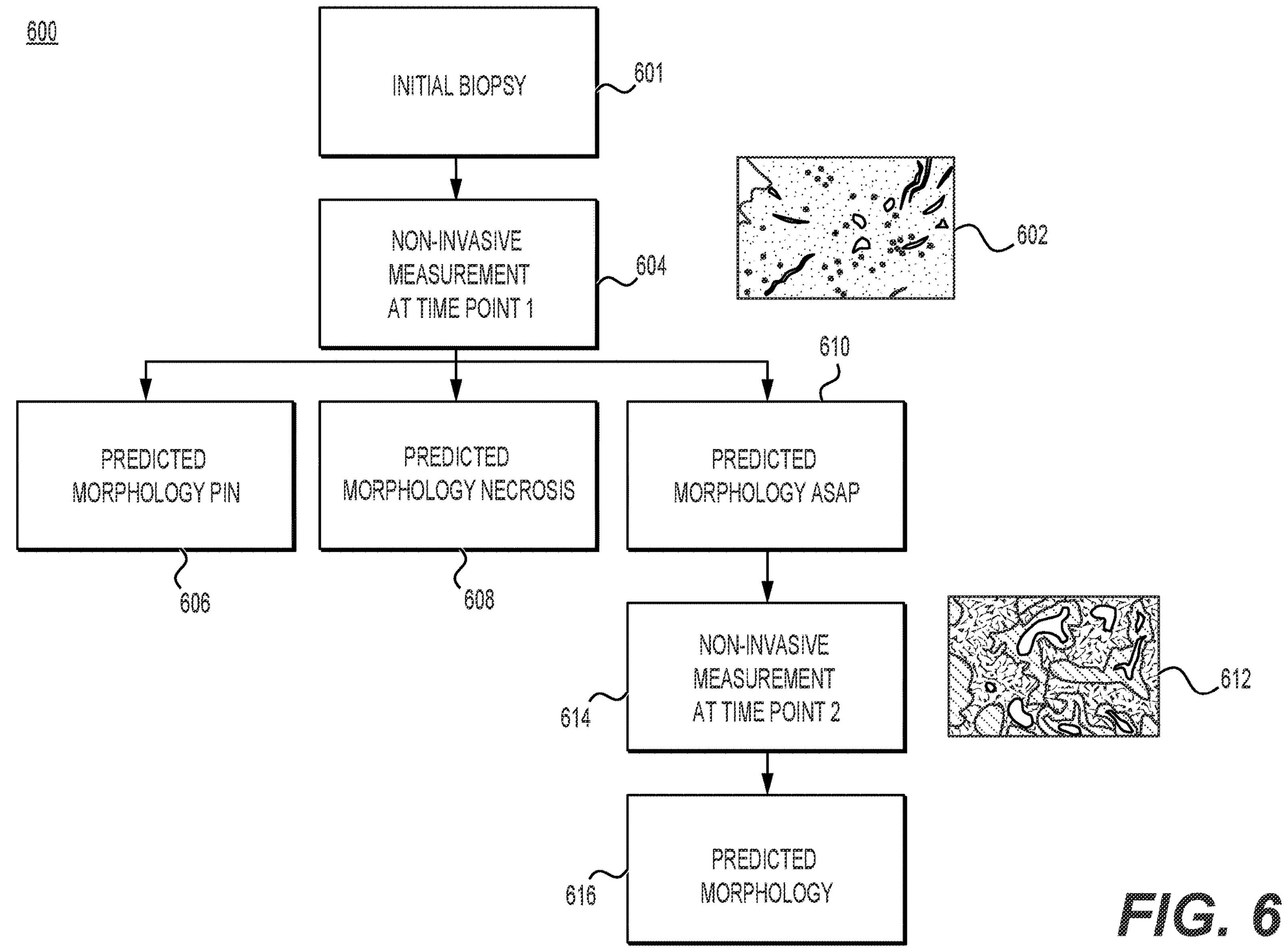
FIG. 6 illustrates an exemplary flowchart for a prostate tissue morphology trajectory prediction, according to techniques presented herein.

FIG. 6 illustrates an exemplary flowchart 600 for a prostate tissue morphology trajectory prediction, according to techniques presented herein. FIG. 6 may be an exemplary flowchart of a projection performed by the histology morphology trajectory prediction tool 141. For example, FIG. 6 may be a flowchart of utilizing the trained system described in FIGS. 5A and/or 5B.

As shown in flowchart 600, the target patient may have an initial biopsy 601 of the prostate tissue. At a first time point following the initial biopsy, a digital image of a histopathological slide 602 prepared from the biopsied prostate tissue and an amount of time passed between the initial biopsy and the first time point may be provided as input to the machine learning system, along with any patient clinical data to date (including a diagnosis associated with the initial biopsy) and a first set of one or more noninvasive measurements 604 collected at a first time point. As output, the machine learning system (e.g., the machine learning system described in FIG. 5A and/or FIG. 5B) may provide one or more predicted prostate tissue morphologies at the first time point. In some examples, the output may include a confidence score (between 0 and 1) of each predicted prostate tissue morphology being present within the tissue at the given time point. Confidence may refer to the confidence that a predicted morphology is present. The confidence score may be the cumulative probability and this value may express the confidence of having this exact value of the measurement, or a less severe versions of it, or the value can demonstrate the absence of a condition. As shown in the diagram below, for the first time point, the predicted prostate tissue morphologies may include prostatic intraepithelial neoplasia (PIN) 606, necrosis 608, and atypical small acinar proliferation ("ASAP") 610, each having an associated confidence output by the system. In one example PIN 606 may have a confidence of 0.4 (e.g., 40%), the predict amount of necrotic tissue may have a confidence of 0.9 (e.g., 90%), and the ASAP may have a confidence of 0.5 (e.g., 50%). Based on these scores, there may be a 40% chance that PIN is present and a 90% chance that WSI has this particular amount of necrotic tissue (e.g., that 20% of the tissue of the slide has this). In some aspects, an artificial image of the prostate tissue including the one or more predicted prostate tissue morphologies may be generated and output by the machine learning system.

At a second time point, a second set of one or more noninvasive measurements may be collected (e.g., measurement 614). In some examples, a time interval between the first time point and the second time point may be based on the type of cancer and associated characteristics thereof (e.g., aggressiveness of progression) being monitored for. Additionally, the time interval may be based on and/or adjusted to account for the previously predicted histological morphologies at the first time point. The digital image of the histopathological slide 612 prepared from the biopsied prostate tissue may be provided as input to the machine learning system, along with any patient clinical data to date and the second set of one or more noninvasive measurements 614. In some examples, predicted prostate tissue morphologies and/or the associated artificially generated images from earlier time points may also be included as input data. As output, the machine learning system may provide one or more predicted prostate tissue morphologies 616 at the second time point. As shown in FIG. 7B, for the second time point, the predicted prostate tissue morphology may include cancer with a Gleason score of 3. In some aspects, an artificial image of the prostate tissue representing the predicted prostate tissue morphology at the second time point may be generated by the machine learning system. The machine learning system may continue to be re-run at the same or adjusted time intervals at a third time point, fourth time point, etc. The predictions (e.g., histological morphologies and/or images representing the histological morphologies) may be provided as input to one or more systems, such as a visualization system and/or alert generation system, each described in turn below.

FIG. 6 may describes the application of the system for predicting prostate tissue morphologies. Techniques presented herein may be applied to a variety of different type of tissues.

FIGS. 7A-7D illustrate an exemplary graph 700 of a histological trajectory prediction, according to techniques presented herein. The exemplary graph may be for a prostate cancer prediction. The exemplary graph may have an x-axis 702 that indicates time and a y-axis 704 that indicates the particular histological prediction (e.g., a prostrate grade). The graph 700 may depict the histological morphology trajectory that, for example the histology morphology prediction module 206 performs.

Line 714 may represent the histological morphology trajectory with the highest confidence. As line 714 extends further in time, the confidence value may not be constant, but individual values along the line 714 may indicate the highest confidence level prediction (e.g., a WSI with histology morphologies) at the future indicated time. Each point along the line 714 may correspond to a predicted image of a histology morphology with the highest confidence. The confidence value may decrease as the time increases (e.g., further to the right along the x-axis).

The line 714 may be between a confidence bound indicated by line 720 and line 718. The line 714 may correspond to a highest confidence value prediction. The confidence bound may show potential histological morphologies at points within a particular confidence range. For example, the line 714 may correspond to an exemplary highest confidence value of 0.8. The line 720 and line 718 may indicate the highest and lowest histology prediction (e.g., a grade of cancer) within a selected confidence score such as 0.7. The inner area 716 between the lines 720 and line 718 may represent predictions within the selected confidence score. The user may select/set the confidence score, or the system may automatically assign this value such as 0.7.

Figure 7A:
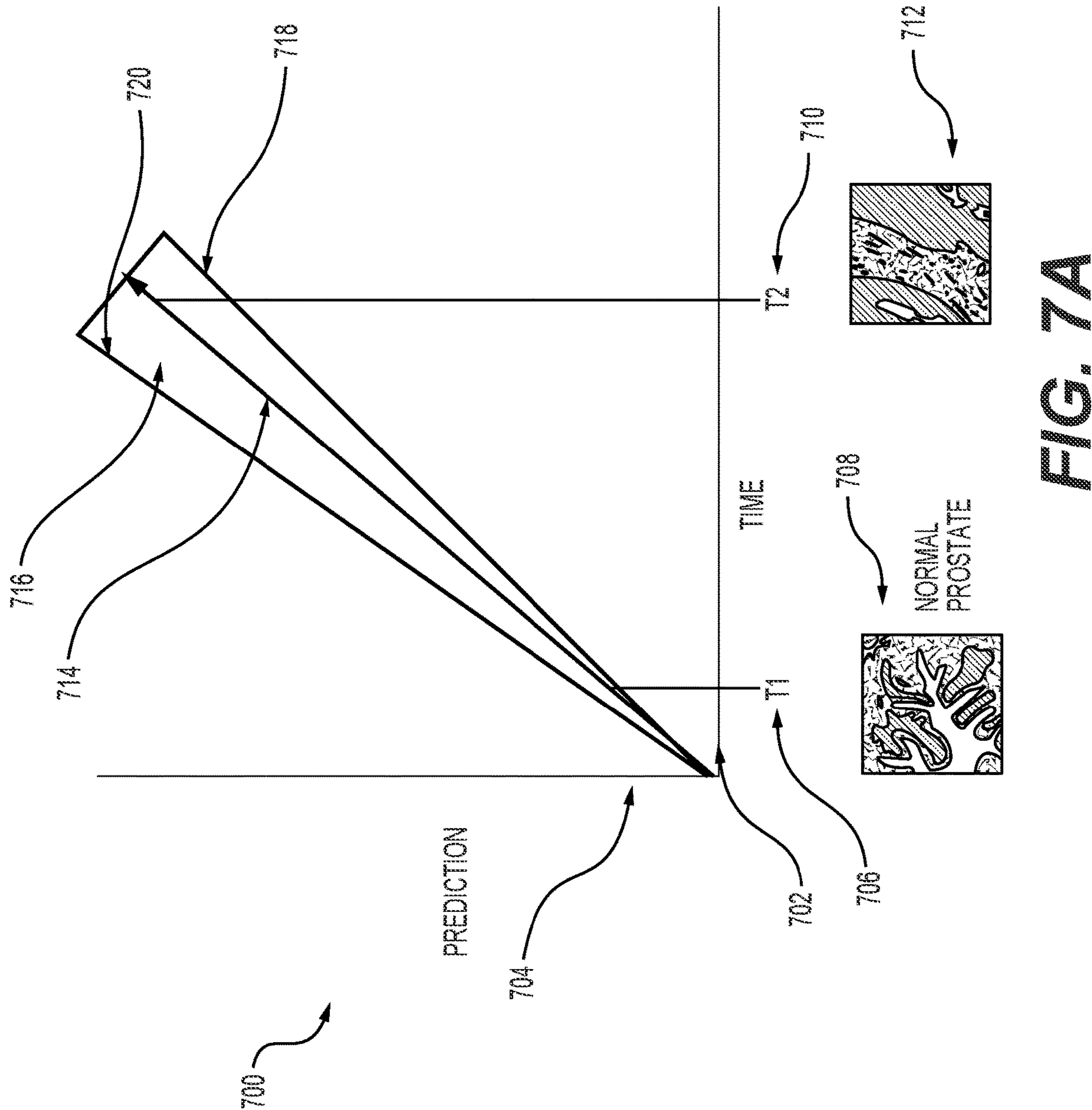
FIGS. 7A-7D illustrate an exemplary graph of a histological trajectory prediction, according to techniques presented herein.
Figure 7B:
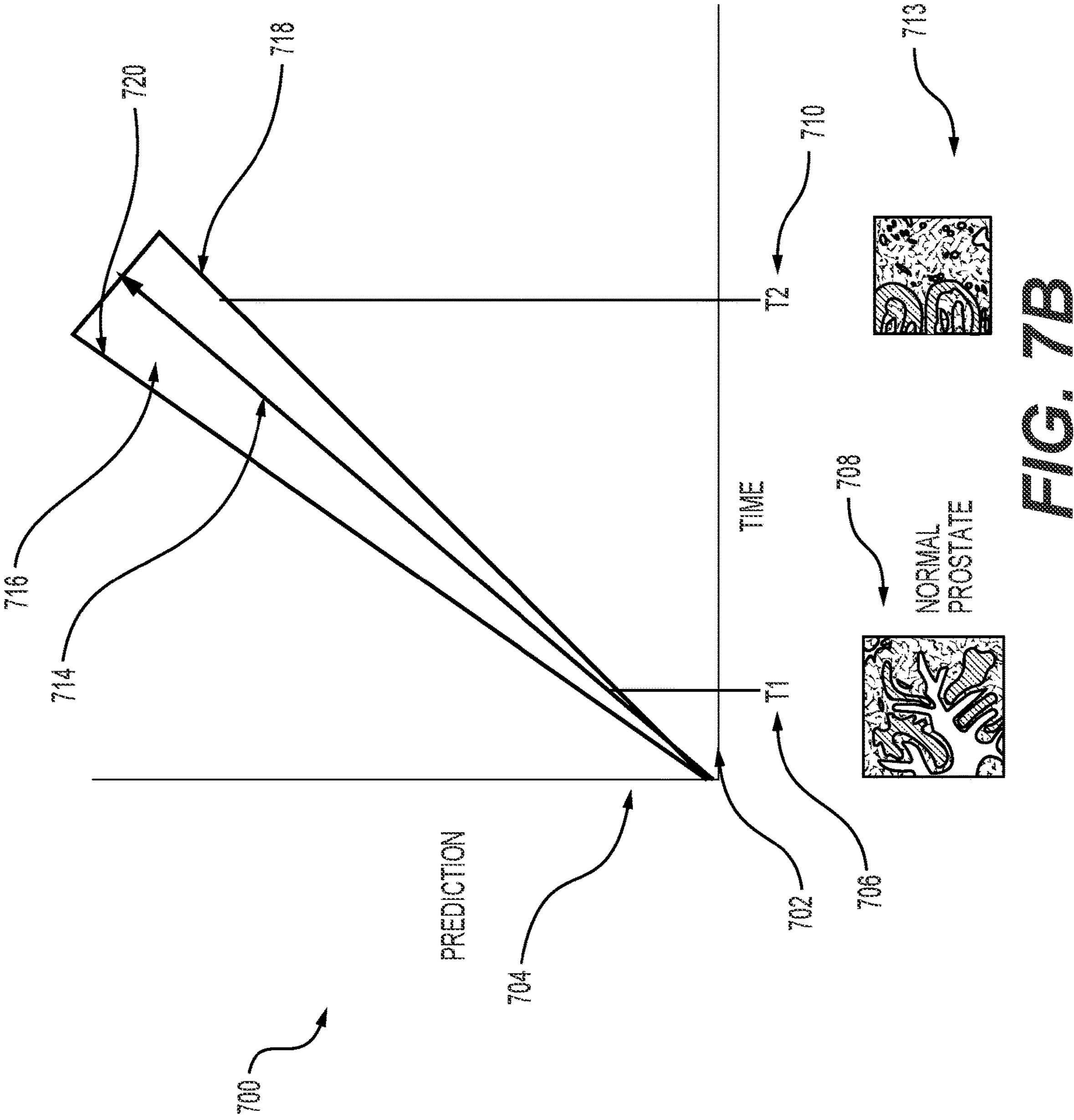

FIG. 7A displays a predicted WSI 708 at time T1 706. T1 may be for example a year from the current time point. In this example, the WSI 708 may indicate a normal prostate. The system, e.g., the histology morphology prediction module 206, may then at T2 710 predict a WSI 712 wherein the predicted histological morphology indicates a Grade 5 Gleason Score. This predicted WSI 712 may correspond to the highest confidence score prediction of the system.

FIG. 7B depicts an example predicted WSI 713 at T2 710. The predicted WSI 713 may be generated not along the main trajectory (e.g., not along the highest confidence score). The system may have less confidence in the predicted WSI 713 compared to the WSI 712. This WSI 712 may be at an edge of the confidence interval and indicate a Grade 2 (3+4) Gleason score.

Figure 7C:
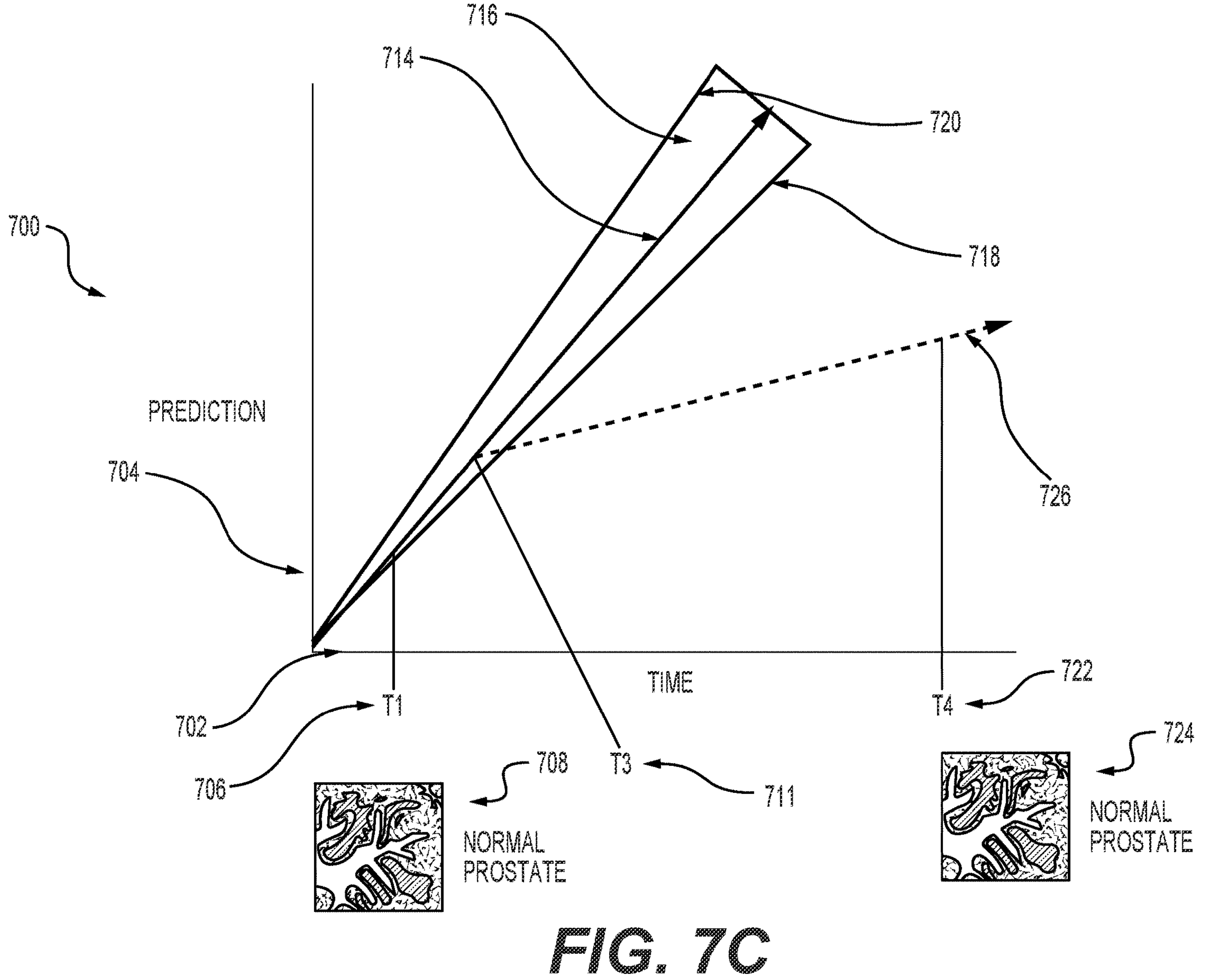

FIG. 7C depicts a graph 700 an exemplary scenario where the system includes an input of an intervention (e.g., a healthier habit such as increased exercise or healthier eating) at a time T3 711. Line 726 depicts the updated trajectory of the histological morphology based on the intervention. At T4 722, the predicted WSI 724, based on the intervention may indicate a normal prostate that does not include prostate cancer. Interventions may include updated physical activity, updated diet related information, or updated environmental data. The new line 726 may further include confidence intervals similar to those lines 720, 718 (not shown).

Figure 7D:
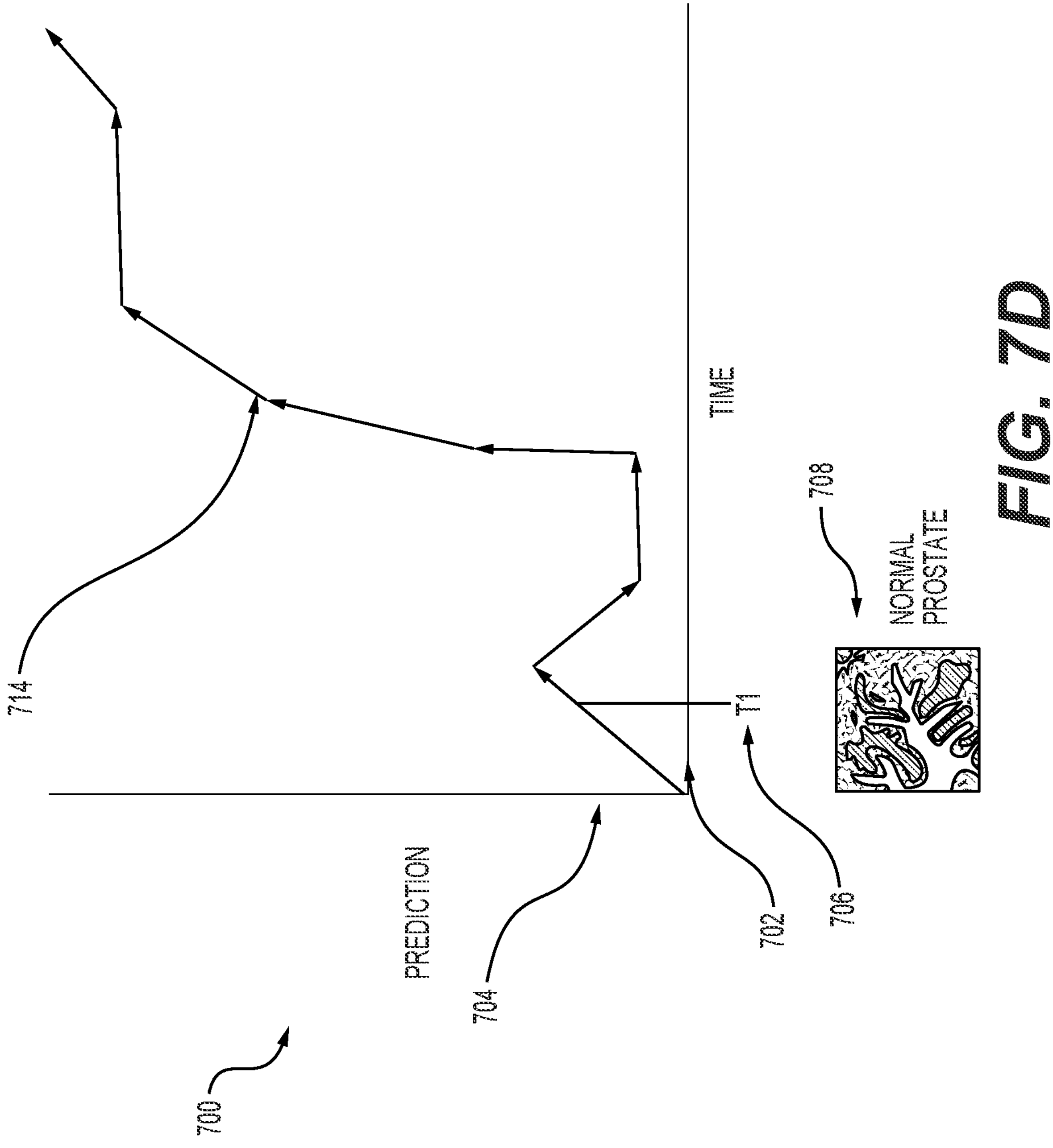

FIG. 7D indicates how the trajectory line 714 may continuously shift in direction based on various inputted interventions.

Other techniques described herein used in conjunction with the above-described prediction of histological morphology trajectories may include application of AI technology, machine learning, and/or image processing tools to provide a visualization system for showing an estimated evolution of histological morphology (and thus estimated evolution of disease over time). The interface may be for example shown in the visualization system 800 depicted in FIG. 8. This visualization may be performed by, histology morphology trajectory prediction tool 141. In some examples, the visualization system may be a separate system from the above discussed system for predicting histological morphology trajectory, and the artificial images representing the predicted one or more histological morphologies at multiple time points into the future (e.g., the predicted images) may be provided as input to the visualization system. In other examples, the system for predicting histological morphology trajectory may be integrated within the visualization system.

Figure 8:
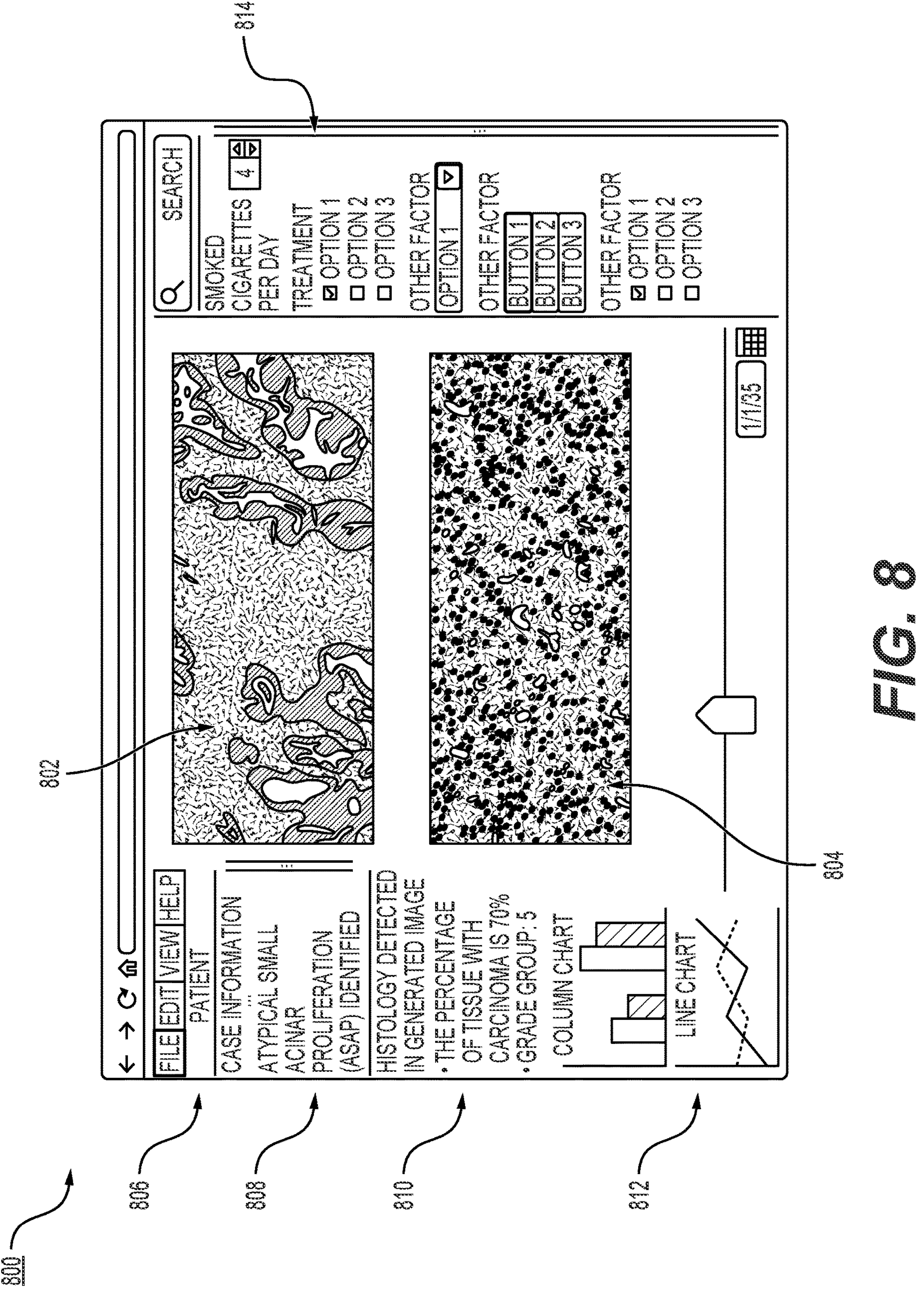
FIG. 8 illustrates an exemplary graphical user interface for a system that performs a histological morphology trajectory prediction, according to techniques presented herein.

FIG. 8 illustrates an exemplary graphical user interface for a system that performs a histological morphology trajectory prediction, according to techniques presented herein. The visualization system 800 (e.g., a user interface such as a GUI) may enable a user (e.g., a pathologist) to visually inspect and explore how the histological morphology is predicted to change over time and what factors may impact those changes to inform patient monitoring, treatments, and/or lifestyle recommendations to slow progression of the disease. The visualization system may include patient information 806, case information 808, and histology 810 detected in the predicted morphology in a left column. Further, a line chart or graph 812 may depict additional information on the histology detected. As one example, the predicted images may be provided to the user sequentially (e.g., corresponding to a timeline of the multiple future time points) within a graphical user interface (GUI), where the user may utilize GUI control elements (e.g., scroll elements) to move from a current time point to future time points to visually inspect how the histological morphology progresses over time. An initial biopsy 802 may be depicted at the top of the screen. The generated predicted WSI 804 at a given time point may be displayed below the initial biopsy 802. The WSI 804 may correspond to the prediction with the highest confidence value (e.g., a prediction along the trajectory line 714 of FIG. 7A-7D). A sidebar (or other user interface) below the predicted WSI may allow for a user to adjust the date for predicted image. As the date is adjusted, this may alter the predicted WSI 804 as this is updated per predicted time. The progression may inform patient monitoring and/or treatments. For example, the user may identify that after five years, the tissue shows concerning morphologies, and thus may recommend a follow-up screening and/or biopsy in three years. Additionally, the progression may inform lifespan predictions.

Additionally, in at least examples where the system for predicting histological morphology trajectory may be integrated within the visualization system, the visualization system may allow the user to adjust factors (e.g., the input variables) to understand how each of these factors may, individually or in combination, influence the evolution. This may be performed on a right column 814. For example, the GUI may provide GUI control elements (e.g., slider bars) to adjust one or more of the input variables of the machine learning system, such as measurements associated with population density and/or air quality (e.g., to indicate a lower population density and improved air quality). Further, additional treatment and factors may be adjusted by a user. The machine learning system may be re-run with the adjusted input variables and output newly predicted images representing histological morphologies at the multiple time points in the future. The user may then identify how the changes to these input variables affected the histological morphology trajectories overtime, which may inform lifestyle recommendations to slow progression of the disease and/or at least make patients aware of associated risks (and which risks are more contributory than others). For example, the target patient may currently live in a densely populated city with poor air quality, such as New York City. If based on the adjustment to the input variables associated with the population density and/or air quality, a slowing of the disease progression was indicated, the target patient may be made aware of the risks associated with remaining in New York City. Other similar recommendations and/or risk awareness could be made with relation to diet, activity, etc.

Other techniques described herein used in conjunction with the above-described prediction of histological morphology trajectories may include application of AI technology, machine learning, and/or image processing tools to provide an alert generation system that automatically generates and transmits one or more notifications to healthcare professionals and/or patients to indicate a follow-up appointment, screening, or procedure is to be scheduled based on the predicted histological morphology trajectories. In some examples, the alert generation system may be a separate system from the above discussed system for predicting histological morphology trajectory. In other examples, the system for predicting histological morphology trajectory may be integrated within the alert generation system. For example, this alert generation system may be performed by the histology morphology trajectory prediction tool 141

As one example, noninvasive measurements may be collected from patient devices and/or external monitoring systems at pre-defined intervals (e.g., based on a type of disease being monitored and/or a current state of the patient's disease). In some examples, at each time point that the noninvasive measurements are collected, the machine learning system of the histological morphology trajectory prediction module may be run using the noninvasive measurements, along with digital images and patient clinical data, as input in order to predict at least a current histological morphology for the patient. Additionally, future histological morphologies (e.g., morphologies at future time points) may also be predicted. In other examples, the machine learning system may be run at the pre-defined intervals regardless of whether any noninvasive measurements are received to predict current and/or future histological morphologies. Based on the prediction, a notification may be automatically generated and transmitted to healthcare professionals and/or patients to indicate a follow-up appointment, screening, or procedure is to be scheduled. In some examples, a threshold value associated with the prediction may be met. Upon reaching the threshold value, the system may trigger the generation of the notification (e.g., a certain type of morphology that is concerning or a particular indication of speed of progression of the disease). In further examples, the notification may include the noninvasive measurements.

To provide one non-limiting, illustrative example, the alert generation system may implement the machine learning system of the histology morphology trajectory prediction tool 141 to traverse a trajectory for a particular risk setting (e.g., most likely outcome, worst outcome, etc.) and values for input variables (e.g., with particular confidence intervals). The alert generation system may then analyze particular morphologies predicted at current and/or future time points and determine whether one or more of the morphologies predicted meets a threshold to result (e.g., a threshold value) in notification generation and transmission. The notification generation and transmission may be sent via server systems 110, physician servers 121, hospital servers 122, clinical trial servers 123, research lab servers 124, and/or laboratory information systems 125. In some examples, when the threshold is met, the portion of the trajectory in which the one or more morphologies is predicted (e.g., the point in time in the future) may be indicated and an associated image generated by the machine learning system that represents the morphology at the given time point may be included as part of the notification for review by the pathologist.

In some aspects, a notification generated and transmitted to a healthcare professional may also include a recommended type of screening and/or treatment, such as a needle vs. punch biopsy or resection. The recommendation may be learned from the training data from patient journeys that includes types of screenings and/or treatments that were performed at a given time point based on a given morphology identified.

As previously discussed, follow-up visits are a common feature of patient monitoring for various disease types such as cancer. Reducing the number of visits or having a large time interval between visits reduces costs, but also increases the chance that the cancer, if it has progressed and/or has recurred, will be detected in a later stage. The alert generation system may provide an optimal bridge by allowing for a reduced number of visits with larger time intervals in between when there are no indications of progression, but avoiding the consequences of later stage detection by proactively initiating a follow-up (e.g., more frequent than the time interval) when a sign of progression is predicted.

Figure 9:
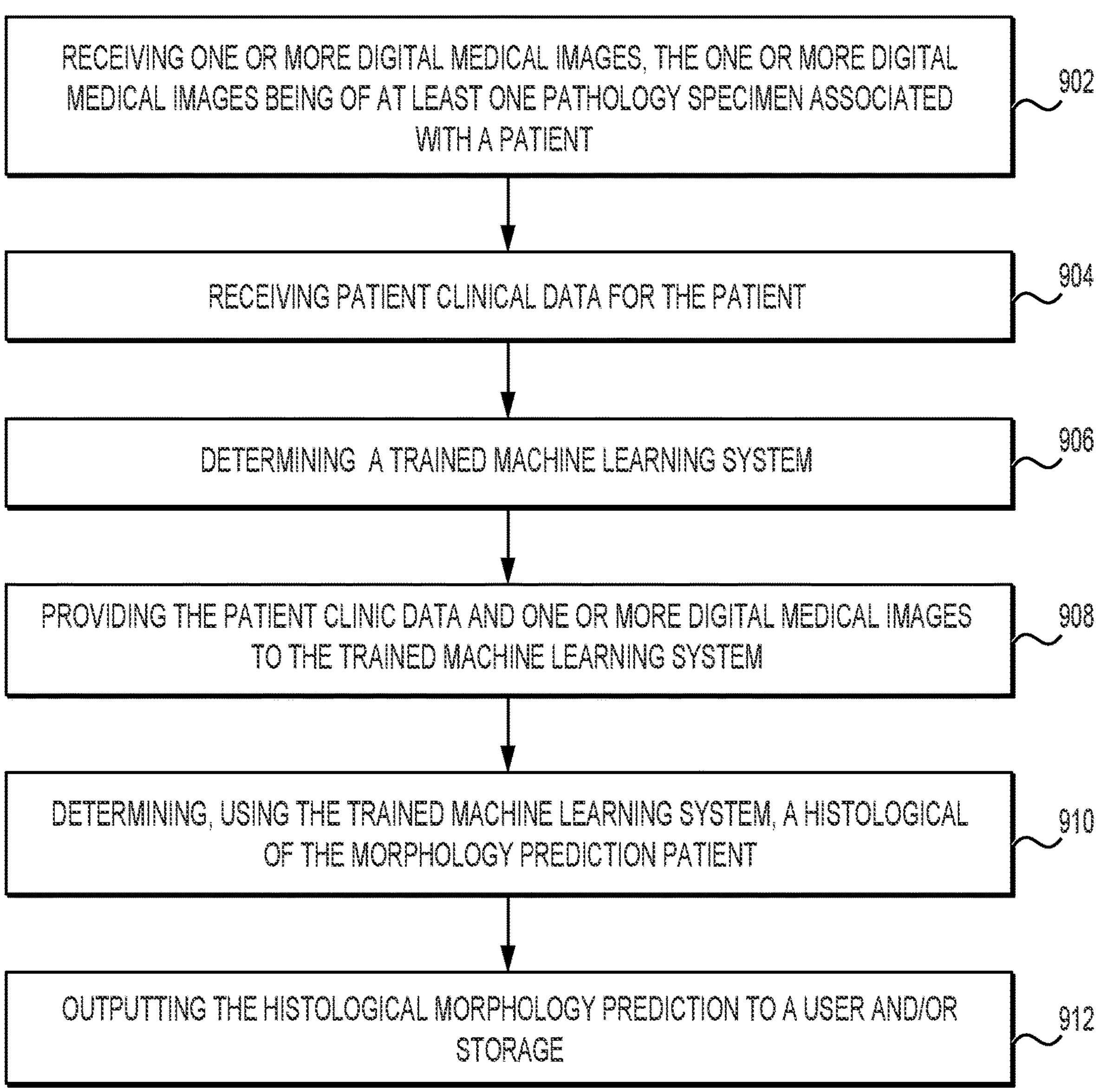
FIG. 9 illustrates an exemplary flowchart for processing images to determine a histology morphology trajectory prediction, according to techniques presented herein.

FIG. 9 illustrates an exemplary flowchart 900 for processing images to determine a histology morphology trajectory prediction, according to techniques presented herein.

At step 902, one or more digital medical images may be received, the one or more digital medical images being of at least one pathology specimen associated with a patient; At step 904, patient clinical data for the patient may be received.

At step 906, a trained machine learning system may be determined. At step 908, the patient clinic data and one or more digital medical images may be provided to the trained machine learning system.

AT step 910, using the trained machine learning system, a histological morphology prediction of the patient may be determined.

At step 912, the histological morphology prediction may be output to a user and/or storage.

Figure 10:
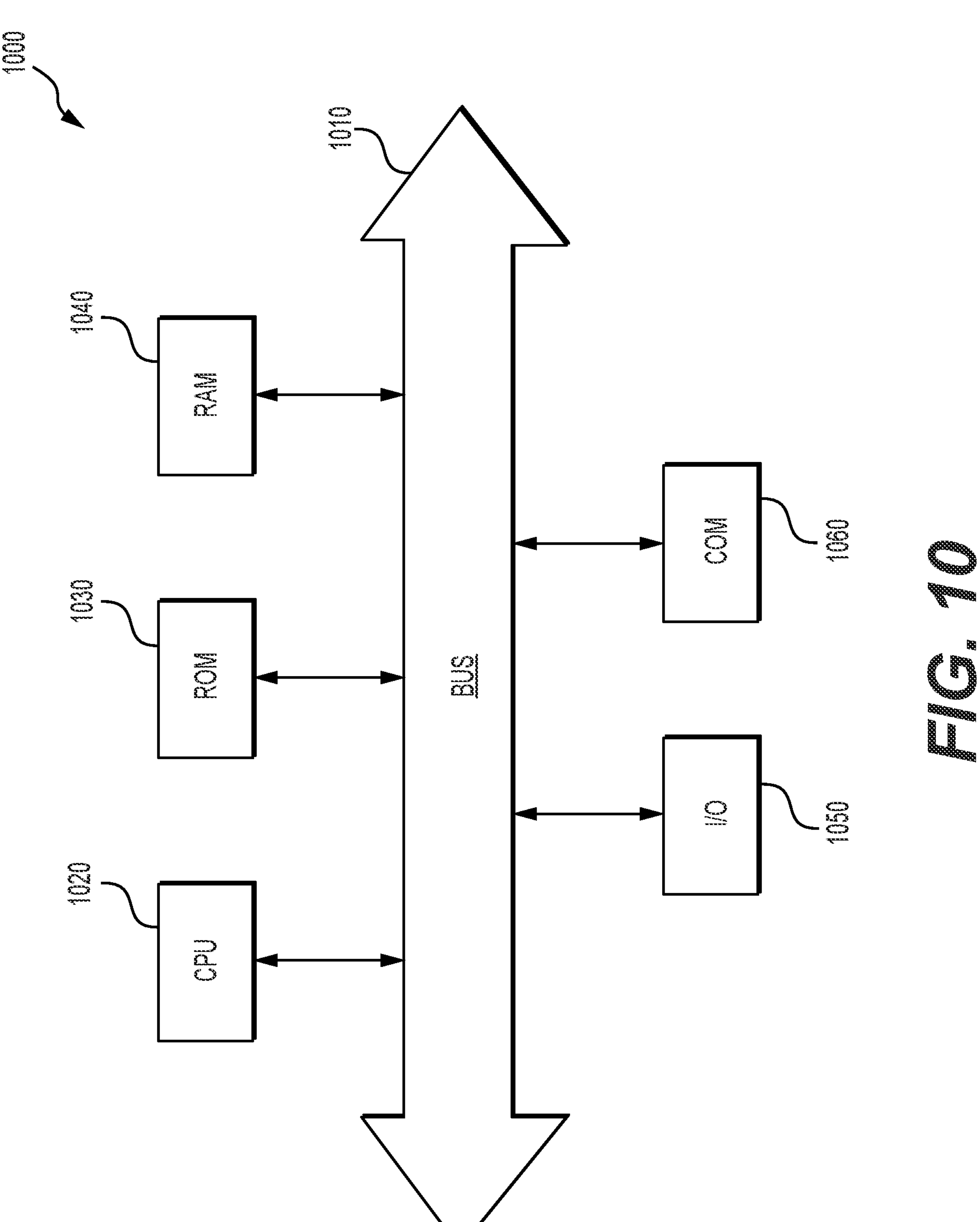
FIG. 10 depicts an example of a computing device that may execute techniques presented herein, according to one or more embodiments.

As shown in FIG. 10, device 1000 may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multiprocessor system, such system operating alone, or in a cluster of computing devices operating in a cluster or server farm. CPU 1020 may be connected to a data communication infrastructure 1010, for example a bus, message queue, network, or multi-core message-passing scheme.

Device 1000 may also include a main memory 1040, for example, random access memory (RAM), and also may include a secondary memory 1030. Secondary memory 1030, for example a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1030 may include similar means for allowing computer programs or other instructions to be loaded into device 1000. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 1000.

Device 1000 also may include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface 1060 may be in the form of signals, which may be electronic, electromagnetic, optical or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 1000 may also include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments may be apparent to those skilled in the art from consideration of the specification and practice of the invention disclosed herein. It is intended that the specification and examples be considered as exemplary only.

What is claimed is:

1. A computer-implemented method for processing electronic medical images to predict one or more histological morphologies, comprising:

- receiving one or more digital medical images, the one or more digital medical images being of at least one pathology specimen of a subject;
- receiving subject clinical data for the subject;
- determining a trained machine learning system;
- providing the subject clinical data and one or more digital medical images to the trained machine learning system;
- determining, using the trained machine learning system, a histological morphology prediction of the subject;
- determining, using the trained machine learning system, a histological morphology trajectory;
- determining one or more notifications to indicate a follow-up appointment, screening, and/or procedure to be scheduled based on the determined histological morphology trajectory; and
- outputting the histological morphology prediction to a user and/or storage.

2. The method of claim 1, wherein the subject clinical data includes at least one of heart rate, blood measurements, activity, and diet-related measurements.

3. The method of claim 1, further including receiving subject environmental data for the subject, the subject environmental data including temperature, ultraviolet (UV) index, air quality index (AQI), nitrogen dioxide levels, particulate matter levels, water quality levels, and/or population density.

4. The method of claim 1, further including:

receiving location data of the subject.

5. The method of claim 1, further including:

identifying a saliency of each region within the one or more digital medical images; and excluding non-salient image regions from subsequent processing.

6. The method of claim 1, further including:

determining a risk setting for the subject;

inputting the risk setting in the trained machine learning system; and utilizing the risk setting to help determine the a histological morphology prediction of the subject.

7. The method of claim 1, further including:

determining a confidence for the histological morphology prediction, the confidence being the confidence that the morphology prediction is present within a tissue of the subject at a given time point.

8. The method of claim 1, further including:

determining a second histological morphology prediction for a future time point, the future time point being based on a type of cancer and cancer characteristics.

9. The method of claim 1, further including:

determining an image representing a histological morphology prediction trajectories.

10. The method of claim 1, wherein the histological morphology prediction is of prostate tissue morphologies and the histological morphology predictions includes prostatic intraepithelial neoplasia, necrosis, and/or atypical small acinar proliferation predictions.

11. The method of claim 1, wherein the clinical data is obtained from a wearable device on the subject.

12. The method of claim 1, further including:

reviewing the predicted histological morphology prediction;

determining whether one or more of the histological morphologies predictions meets a threshold value; and upon determining a morphologies prediction breaks a threshold value, generating an alert for a healthcare professionals and/or the subject.

13. A system for processing electronic medical images, the system comprising:

at least one memory storing instructions; and at least one processor configured to execute the instructions to perform operations comprising:

receiving one or more digital medical images, the one or more digital medical images being of at least one pathology specimen of a subject;

receiving subject clinical data for the subject;

determining a trained machine learning system;

providing the subject clinical data and one or more digital medical images to the trained machine learning system;

determining, using the trained machine learning system, a histological morphology prediction of the subject;

determining, using the trained machine learning system, a histological morphology trajectory;

determining one or more notifications to indicate a follow-up appointment, screening, and/or procedure to be scheduled based on the determined histological morphology trajectory; and outputting the histological morphology prediction to a user and/or storage.

14. The system of claim 13, wherein the subject clinical data includes at least one of heart rate, blood measurements, activity, and diet-related measurements.

15. The system of claim 13, further including receiving subject environmental data for the subject, the subject environmental data including temperature, ultraviolet (UV) index, air quality index (AQI), nitrogen dioxide levels, particulate matter levels, water quality levels, and/or population density.

16. The system of claim 13, further including:

receiving location data of the subject.

17. The system of claim 13, further including:

identifying a saliency of each region within the one or more digital medical images; and excluding non-salient image regions from subsequent processing.

18. The system of claim 13, further including:

determining a risk setting for the subject;

inputting the risk setting in the trained machine learning system; and utilizing the risk setting to help determine the a histological morphology prediction of the subject.

19. A non-transitory computer-readable medium storing instructions that, when executed by a processor, perform operations processing electronic medical images, the operations comprising:

receiving one or more digital medical images, the one or more digital medical images being of at least one pathology specimen of a subject;

receiving subject clinical data for the subject;

determining a trained machine learning system;

providing the subject clinical data and one or more digital medical images to the trained machine learning system;

determining, using the trained machine learning system, a histological morphology prediction of the subject;

determining, using the trained machine learning system, a histological morphology trajectory;

determining one or more notifications to indicate a follow-up appointment, screening, and/or procedure to be scheduled based on the determined histological morphology trajectory; and outputting the histological morphology prediction to a user and/or storage.

* * * * *